United States Patent
Hosokawa et al.

(10) Patent No.: US 8,085,637 B2
(45) Date of Patent: Dec. 27, 2011

(54) TRACKING ERROR SIGNAL DETECTION APPARATUS AND OPTICAL DISC APPARATUS

(75) Inventors: Osamu Hosokawa, Tokyo (JP); Nobuyoshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 12/569,002

(22) Filed: Sep. 29, 2009

(65) Prior Publication Data

US 2010/0080100 A1 Apr. 1, 2010

(30) Foreign Application Priority Data

Sep. 30, 2008 (JP) ................. 2008-253077

(51) Int. Cl.
*G11B 5/09* (2006.01)
*G11B 27/36* (2006.01)
*G11B 7/00* (2006.01)

(52) U.S. Cl. ............... 369/53.35; 369/47.35; 369/59.12; 369/59.2; 369/44.41

(58) Field of Classification Search ............... 369/53.35, 369/47.35, 59.12, 59.2, 124, 44.41; 341/155; 59/21
See application file for complete search history.

(56) References Cited

U.S. PATENT DOCUMENTS

| | | | | |
|---|---|---|---|---|
| 6,693,863 B2 * | 2/2004 | Shoji et al. | ................. | 369/47.35 |
| 2002/0172112 A1 * | 11/2002 | Shoji et al. | ................. | 369/47.35 |
| 2006/0209991 A1 * | 9/2006 | Oshikubo et al. | ............. | 375/330 |
| 2009/0003167 A1 * | 1/2009 | Kobayashi | ................. | 369/53.12 |

FOREIGN PATENT DOCUMENTS

| | | |
|---|---|---|
| JP | 57-181433 | 11/1982 |
| JP | 57-191839 | 11/1982 |
| JP | 63-131334 | 6/1988 |
| JP | 63-148433 | 6/1988 |
| JP | 07-296395 | 11/1995 |
| JP | 3065993 | 5/2000 |
| JP | 3336778 | 8/2002 |
| JP | 3439393 | 6/2003 |
| JP | 3769888 | 2/2006 |
| JP | 2006-260645 A | 9/2006 |

* cited by examiner

*Primary Examiner* — Mohammad Ghayour
*Assistant Examiner* — Aneeta Yodichkas
(74) *Attorney, Agent, or Firm* — Wolf, Greenfield & Sacks, P.C.

(57) ABSTRACT

A DPD tracking error signal detection apparatus includes the following. Four differentiators remove DC components and differentiate four signal with varying differential phases. The signals are then sampled and quantized by four A/D converters, and output to a non-inverting unit and an inverting unit. A phase inverter/compositor then leaves as-is or phase-inverts the output signals, according to a control signal. The non-inverting and the inverting unit each include two Hilbert transformers that phase-shift the output from the A/D converters, two delay units that delay the output of the other A/D converters to match the delay of the Hilbert transformers, two cross-correlators that calculate the cross-correlation between pairs of Hilbert transformers and delay units, and an adding unit that combines the cross-correlator results and outputs the combined result to the phase inverter/compositor.

11 Claims, 10 Drawing Sheets

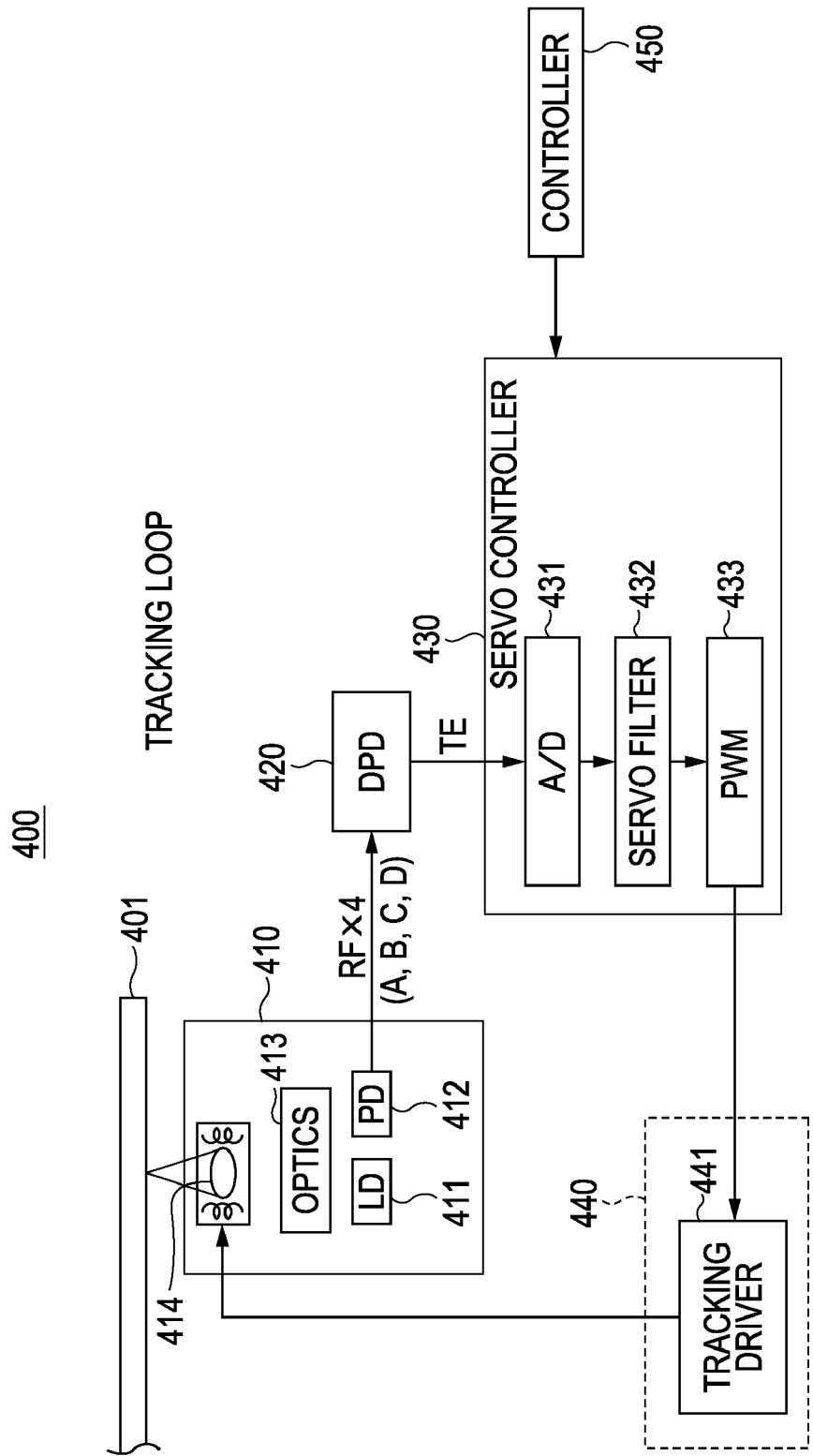

TRACKING ERROR SIGNAL DETECTION APPARATUS AND OPTICAL DISC APPARATUS

BACKGROUND OF THE INVENTION

1. Field of the Invention

The present invention relates to a tracking error signal (TE) detection apparatus using differential phase detection (DPD) in an optical disc or similar apparatus, as well as to an optical disc apparatus.

2. Description of the Related Art

In optical disc controllers, a DPD tracking error (TE) detection apparatus (i.e., circuit) is often provided in order to generate a TE signal for ROM-type discs. Currently, such DPD TE detection apparatus are realized by means of high-speed, high-precision analog circuits (see, for example, Japanese Patent Nos. 3336778, 3065993, 3439393, and 3769888, and Japanese Unexamined Patent Application Publication Nos. S57-191839, S57-181433, S63-148433, H07-296395, S63-131334, and 2006-260645).

Meanwhile, however, the integration of analog signal processing and digital signal processing onto a single chip has been progressing in recent years, in conjunction with the development of system LSI technology. Optical disc controller chips are not an exception to this trend. Thus, in conjunction with the development of the increasing digitization of signal processing, there is demand for DPD TE detection apparatus to be integrated onto a digital chip.

Technology designed to meet this demand will now be described using the following examples 1 to 3.

EXAMPLE 1

In the technology of Example 1, a DPD circuit designed as an analog circuit is consolidated on a digital chip "as-is", using analog circuit technology.

More specifically, an existing configuration (made up of high-range boosters (equalizers), binarizers (slicers), and an edge-comparing phase comparator) may be mounted as-is onto a digital chip using analog circuit technology, like that described by way of example in Japanese Patent No. 3336778.

In this case, the number of high-range boosters (equalizers) and binarizers (slicers) is equal to the number of DPD computation channels (i.e., 2 or 4).

Strictly speaking, differential phase detection can still be conducted without a high-range boost circuit (equalizer). However, since an edge-comparing phase comparator is used, a high-range boost circuit (equalizer) is used to suitably conduct binarization.

The binarizers (slicers) and edge-comparing phase comparator are adopted in order to suppress fluctuations in TE detection sensitivity, which depends on RF amplitude. By detecting the differential phase of edges only, the sensitivity with respect to amplitude fluctuations is suppressed.

The edge-comparing phase comparator incorporates a mechanism to remove pseudo-edges and chattering produced by phenomena such as reductions, noise, or asymmetry in high-range frequency characteristics (the f curve) due to disc skew or defocusing (OTF fluctuations). Such a mechanism is used to remove such noise and render practical the TE detection sensitivity.

For this reason, the edge-removing mechanism is realized by means of an asynchronous recursive circuit configuration.

EXAMPLE 2

The approach taken by Example 2 involves the adoption of the analog correlation detection technique disclosed in Japanese Unexamined Patent Application Publication No. S57-191839.

The circuit in Example 2 is made up of a 90° phase shifter, a multiplier, and an LPF, all fully realized in analog.

In the previous Example 1, a signal is first suitably binarized, and its edges are then phase-compared. In contrast, in Example 2, waveform phase comparison (i.e., correlation computation) is conducted. Consequently, the technique in Example 2 can in principle omit the high-range boost circuits, whose circuitry scale is large.

In the technology in Example 2, an edge-comparing phase comparator is not used, and thus a mechanism for removing pseudo-edges and chattering by means of asynchronous recursive looping can also be omitted.

EXAMPLE 3

The approach taken by Example 3 involves substituting an existing DPD circuit, realized by a high-speed analog circuit, for digital signal processing (see, for example, Japanese Patent No. 3439393 and Japanese Unexamined Patent Application Publication No. 2006-260645).

The technology in Example 3 includes an A/D converter, a high-range booster and compensator, a zero-cross generator, and a zero-cross phase comparator, configured to process a signal in the above order. Thus, the analog processing system in Example 1 can be said to have been substituted as-is for digital signal processing.

SUMMARY OF THE INVENTION

However, since the high-range boost circuit (i.e., equalizer) used in the above Example 1 is made up of high-order transfer functions, its circuit scale is naturally large. Moreover, there is a problem in that such a circuit is unsuited to analog circuits on minute CMOS processes, with its highly sensitive elements and considerable fluctuation.

In addition, there is another difficulty when the RF frequency changes significantly, such as when performing a full seek from the innermost edge to the outermost edge. In such cases, accurately tracking the extrema and zero point of the transfer function to the frequency change is difficult.

Since the phase comparator is configured as an asynchronous recursive circuit, the upper limit on its operational speed is dependent on the gate delay time, which varies greatly according to process factors and temperature or power supply parameters.

In addition, the established practice in digital circuits of using standard timing analysis (STA) by means of clock-synchronous design is typically not available, even when the phase comparator is configured using a digital gate, and thus it is difficult to guarantee stable, high-speed operation.

Furthermore, in this approach, there is a fundamental problem in that the shrinking of analog circuit blocks does not keep pace with the shrinking of digital circuit blocks that occurs with further miniaturization of semiconductor processes.

More specifically, the following three fundamental problems exist.

(1) With increasingly minute features, fluctuation increases in the threshold value Vth. The channel width W of the MOS transistors is thus increased to reduce such fluctuation.

(2) With increasingly minute features, there is a decrease in the equivalent output resistance $R_o$ of the MOS transistors. The channel width W is thus increased in order to realize a gm that secures compensating gain.

(3) With increasingly minute features, there is a decrease in the power supply voltage. The channel width W is thus increased in order to realize sufficient current flow for securing compensating dynamic range, and in addition, a folded circuit is implemented.

The above three problems invite increased (relative) size in the transistors of the analog circuit, as well as increased current consumption. Consequently, the analog circuit implementation area and power consumption is shrunk by little to none, even as further process shrinks are developed.

For this reason, the on-chip area and current consumption of the analog circuit becomes dominant with increasing miniaturization. Since the cost per unit area rises with a miniaturized process, the above approach is counter-productive from a cost standpoint.

For these reasons, it is not desirable to implement the approach given in Example 1.

In the technology of Example 2 as described earlier, an edge-comparing phase comparator is not used, and thus a mechanism to remove pseudo-edges and chattering by means of an asynchronous recursive loop can be omitted. Consequently, the operational speed problems in Example 1 that were due to gate delay and timing analysis can be avoided in Example 2.

However, the phase detection technique involves using the square of the output sensitivity with respect to the input amplitude. For this reason, fluctuation in the TE detection sensitivity due to amplitude or signal frequency characteristics (the f curve) becomes highly volatile.

In order to resolve this problem, technology with an inserted limiter has been proposed (see, for example, Japanese Unexamined Patent Application Publication Nos. S57-181433 and S63-148433). However, even if the components corresponding to amplitude fluctuations are suppressed by the limiter, the components corresponding to f curve fluctuations are not removed with such technology. Adding the high-range boost, the problem with the f curve fluctuation components is not their absolute values, but their fluctuation, and thus the problem is not resolved.

In addition, given the properties of a tracking error detection circuit, it is difficult to make an automatic gain control (AGC) circuit having a recursive loop and large time constant correctly operate a tracking servo system, and thus the above is usually not added. Even when given a hypothetical feedforward AGC circuit that lacks a recursive loop, it would still be difficult to correctly realize the normalization circuit (i.e., the divider) using analog technology on a practical circuit scale.

In addition, the phase detection technique involves a phase shift circuit able to correctly induce a 90° differential phase. Any inaccuracies in the phase shift will produce inaccuracies in the origin of the TE signal, leading to tracking inaccuracies.

Moreover, the input RF signal is an aggregation of random sequences, and thus the phase detection technique involves accurately conducting 90° phase shifts over the entire range from the DC (0 Hz) to the Nyquist frequency (fs/2) wherein the spectrum of random sequences exists, regardless of the signal period.

However, suitable realization of such characteristics with analog circuitry is likely outside the realm of physical possibility when considered from the perspective of causal laws. A method for actually realizing the above is not demonstrated in either Japanese Unexamined Patent Application Publication Nos. S57-191839 or H07-296395.

An alternative proposal has been given, wherein a fixed-value delay circuit is inserted, and 90° phase differences are equally applied to only certain specified frequencies (see, for example, Japanese Unexamined Patent Application Publication No. S63-131334 and Japanese Patent No. 3065993).

However, since the RF signal is made up of random sequences, the phase of frequencies higher than the specified frequencies are delayed, while the phase of lower frequencies is advanced. In other words, TE center misalignment is produced in respectively opposite directions, and thus the delay amounts are adjusted such that the TE center misalignment reaches zero. This TE center misalignment is not only determined by the generation probability of each period contained in the RF signal, but is also dependent on the f curve and inter-channel balance. Consequently, suitably performing such adjustment is difficult. Furthermore, there are difficulties in coping with situations where the RF frequency itself varies, such as when performing a full seek from the innermost edge to the outermost edge. Consequently, it is not practically feasible to provide a TE detection circuit as disclosed by Japanese Unexamined Patent Application Publication No. S63-131334 and Japanese Patent No. 3065993.

In addition, the analog multiplier uses transistor equivalent emitter resistance, and thus output offset fluctuation and temperature drift is large. In order to suppress these factors to a level that is not problematic for the tracking servo system in practice, the transistor size, and by extension the chip area, is made to be very large, which represents another problem for implementation.

Given the properties of a TE detection circuit, DC components are used, and thus it is not desirable to adopt components such as a DC servo circuit that suppresses offsets.

Thus, given the existence of a variety of issues, the present approach is generally not adopted. Consequently, the technique in Example 1 is primarily used in current analog DPD circuits.

However, there is another problem in that, being an analog technique, the problems (1) to (3) described in the above Example 1 naturally arise. Consequently, it is also difficult to adopt the approach taken in Example 2 from a cost standpoint if implemented using minute CMOS processes.

Meanwhile, according to the approach taken by the above Example 3, the area of the digital signal processor can be shrunk in conjunction with developments in miniaturization technology.

However, this approach involves from two to four high-speed, high-resolution A/D converters. Although the number of A/D converters is dependent on the number of DPD computation channels, four channels are used in the recent mainstream trend.

For example, one representative standard for high-density optical discs, the Blu-ray Disc™, is configured as follows.

In order to acquire the push-pull signal level and ensure playback compatibility in drives adopting DPD TE detection, the pit depth of a ROM disc is taken to be λ/6.

This causes an origin shift (i.e., offset) in the DPD_TE signal to be produced (see, for example, Japanese Patent No. 3769888). In order to remove this origin shift and additionally cancel the effects of lens shift in the optical pickup, a four-channel DPD computation technique is used.

The signal handled by the DPD circuit is an RF-band signal with a high S/N ratio, and is designed to be subjected to linear digital signal processing made up of high-range boosting, interpolation, and zero cross generation. In addition, if the amplitude is constrained, then inaccuracies are produced in the interpolated zero crossing. For this reason, quantization bit reduction using the overscale limiting effect is not conducted.

Consequently, a high-resolution A/D converter corresponding to the A/D converter used in the read channel (such as Viterbi decoding) is used. More specifically, a 4-bit to 6-bit converter is used.

In addition, given the properties of a TE generation circuit, correct operation is also demanded when performing a full seek from the innermost edge to the outermost edge of a disc. Consequently, in order to prevent the occurrence of RF signal folding during full seek operation, it is demanded that the A/D converter operate at a high sampling frequency exceeding the RF channel frequency.

More specifically, in a recent high-density optical disc apparatus, channel codes restricted to d=1 are used, with a highest repeating frequency of 2 T (equal to fcck/4, where fcck is the channel clock frequency). In addition, the ratio of the linear speeds at the innermost edge and the outermost edge is approximately ×2.4 (for a 12 cm disc). Linear speed error is also to be considered. It is therefore demanded that the A/D converter operate at a sampling frequency exceeding 1.2 times fcck.

In this way, four channels make use of high-speed, high-resolution A/D converters, each being realized by high-speed, high-precision analog circuit technology.

Consequently, due to the problems (1) to (3) described in the above Example 1, the on-chip area and current consumption of the A/D converters become dominant with increasing miniaturization of semiconductor processes. When considered from the perspective of cost when carried out using minute CMOS processes, it is not feasible to adopt the current approach.

It is therefore desirable to provide a tracking error signal detection apparatus and an optical disc apparatus wherein a DPD apparatus is realizable as a high-speed, high-precision digital circuit.

A DPD tracking error signal detection apparatus in accordance with an embodiment of the present invention includes: first, second, third, and fourth differentiators configured to remove the DC components of and differentiate a first signal, a second signal, a third signal, and a fourth signal whose differential phases with respect to each other vary according to the tracking error; a first analog/digital (A/D) converter configured to sample and quantize the output of the first differentiator; a second A/D converter configured to sample and quantize the output of the second differentiator; a third A/D converter configured to sample and quantize the output of the third differentiator; a fourth A/D converter configured to sample and quantize the output of the fourth differentiator; a non-inverting unit configured to conduct non-inverting processing with respect to the output of the first, second, third, and fourth A/D converters; an inverting unit configured to conduct inverting processing with respect to the output of the first, second, third, and fourth A/D converters, and cooperatively conduct differential processing with the non-inverting unit; and a phase inverter/compositor configured to leave as-is or invert the phase of the output signals of the non-inverting unit and the inverting unit, in accordance with a control signal. The non-inverting unit includes a first Hilbert transformer configured to phase-shift the output of the first A/D converter by 90°, irrespective of the period of the signal component, a first delay unit configured to delay the output of the second A/D converter so as to match the delay amount of the first Hilbert transformer, a second Hilbert transformer configured to phase-shift the output of the third A/D converter by 90°, irrespective of the period of the signal component, a second delay unit configured to delay the output of the fourth A/D converter so as to match the delay amount of the second Hilbert transformer, a first cross-correlator configured to calculate the cross-correlation between the output of the first Hilbert transformer and the output of the first delay unit, a second cross-correlator configured to calculate the cross-correlation between the output of the second Hilbert transformer and the output of the second delay unit, and a first adding unit configured to add together the output of the first cross-correlator and the output of the second cross-correlator, and output the added result to the phase inverter/compositor as the output of the non-inverting unit.

The inverting unit includes a third Hilbert transformer configured to phase-shift the output of the second A/D converter by 90°, irrespective of the period of the signal component, a third delay unit configured to delay the output of the first A/D converter so as to match the delay amount of the third Hilbert transformer, a fourth Hilbert transformer configured to phase-shift the output of the fourth A/D converter by 90°, irrespective of the period of the signal component, a fourth delay unit configured to delay the output of the third A/D converter so as to match the delay amount of the fourth Hilbert transformer, a third cross-correlator configured to calculate the cross-correlation between the output of the third Hilbert transformer and the output of the third delay unit, a second cross-correlator configured to calculate the cross-correlation between the output of the fourth Hilbert transformer and the output of the fourth delay unit, and a second adding unit configured to add together the output of the third cross-correlator and the output of the fourth cross-correlator, and output the added result to the phase inverter/compositor as the output of the inverting unit.

Preferably, the frequency settings of the first and second Hilbert transformers in the non-inverting unit can be individually set such that their frequencies differ from those of the frequency settings of the third and fourth Hilbert transformers in the inverting unit.

Preferably, the delayed output of the first, second, third, and fourth delay units is formed so as to exhibit the characteristics of a band-pass filter (BPF), and the frequency settings of the first and second delay units in the non-inverting unit can be individually set such that their frequencies differ from those of the frequency settings of the third and fourth delay units in the inverting unit.

Preferably, level limiters are disposed at the output stages of the first, second, third, and fourth Hilbert transformers, as well as at the output stages of the first, second, third, and fourth delay units.

Preferably, the tracking error signal detection apparatus also includes: a first serial/parallel converter configured to convert the output of the first A/D converter from serial data into parallel data, and output the result to the first Hilbert transformer of the non-inverting unit and the third delay unit of the inverting unit; a second serial/parallel converter configured to convert the output of the second A/D converter from serial data into parallel data, and output the result to the first delay unit of the non-inverting unit and the third Hilbert transformer of the inverting unit; a third serial/parallel converter configured to convert the output of the third A/D converter from serial data into parallel data, and output the result to the second Hilbert transformer of the non-inverting unit and the fourth delay unit of the inverting unit; and a fourth serial/parallel converter configured to convert the output of the fourth A/D converter from serial data into parallel data, and output the result to the second delay unit of the non-inverting unit and the fourth Hilbert transformer of the inverting unit.

An optical disc apparatus in accordance with a second embodiment of the present invention includes a disc-shaped optical recording medium, and a DPD tracking error signal detection apparatus that detects a tracking error signal from information regarding light incident on, and reflected off, the optical recording medium. The tracking error signal detection apparatus includes: first, second, third, and fourth differentiators configured to remove the DC components of and differentiate a first signal, a second signal, a third signal, and a fourth signal whose differential phases with respect to each other vary according to the tracking error; a first analog/digital (A/D) converter configured to sample and quantize the output of the first differentiator; a second A/D converter configured to sample and quantize the output of the second differentiator; a third A/D converter configured to sample and quantize the output of the third differentiator; a fourth A/D converter configured to sample and quantize the output of the fourth differentiator; a non-inverting unit configured to conduct non-inverting processing with respect to the output of the first, second, third, and fourth A/D converters; an inverting unit configured to conduct inverting processing with respect to the output of the first, second, third, and fourth A/D converters, and cooperatively conduct differential processing with the non-inverting unit; and a phase inverter/compositor configured to leave as-is or invert the phase of the output signals of the non-inverting unit and the inverting unit, in accordance with a control signal. The non-inverting unit includes a first Hilbert transformer configured to phase-shift the output of the first A/D converter by 90°, irrespective of the period of the signal component, a first delay unit configured to delay the output of the second A/D converter so as to match the delay amount of the first Hilbert transformer, a second Hilbert transformer configured to phase-shift the output of the third A/D converter by 90°, irrespective of the period of the signal component, a second delay unit configured to delay the output of the fourth A/D converter so as to match the delay amount of the second Hilbert transformer, a first cross-correlator configured to calculate the cross-correlation between the output of the first Hilbert transformer and the output of the first delay unit, a second cross-correlator configured to calculate the cross-correlation between the output of the second Hilbert transformer and the output of the second delay unit, and a first adding unit configured to add together the output of the first cross-correlator and the output of the second cross-correlator, and output the added result to the phase inverter/compositor as the output of the non-inverting unit. The inverting unit includes a third Hilbert transformer configured to phase-shift the output of the second A/D converter by 90°, irrespective of the period of the signal component, a third delay unit configured to delay the output of the first A/D converter so as to match the delay amount of the third Hilbert transformer, a fourth Hilbert transformer configured to phase-shift the output of the fourth A/D converter by 90°, irrespective of the period of the signal component, a fourth delay unit configured to delay the output of the third A/D converter so as to match the delay amount of the fourth Hilbert transformer, a third cross-correlator configured to calculate the cross-correlation between the output of the third Hilbert transformer and the output of the third delay unit, a second cross-correlator configured to calculate the cross-correlation between the output of the fourth Hilbert transformer and the output of the fourth delay unit, and a second adding unit configured to add together the output of the third cross-correlator and the output of the fourth cross-correlator, and output the added result to the phase inverter/compositor as the output of the inverting unit.

According to an embodiment of the present invention, a DPD apparatus can be realized as a high-speed, high-precision digital circuit.

BRIEF DESCRIPTION OF THE DRAWINGS

FIG. 8 illustrates an exemplary configuration of an optical recording and playback apparatus able to adopt a TE detection apparatus in accordance with an embodiment of the present invention.

DESCRIPTION OF THE PREFERRED EMBODIMENTS

Hereinafter, embodiments of the present invention will be described in association with the accompanying drawings.

Figure 1:
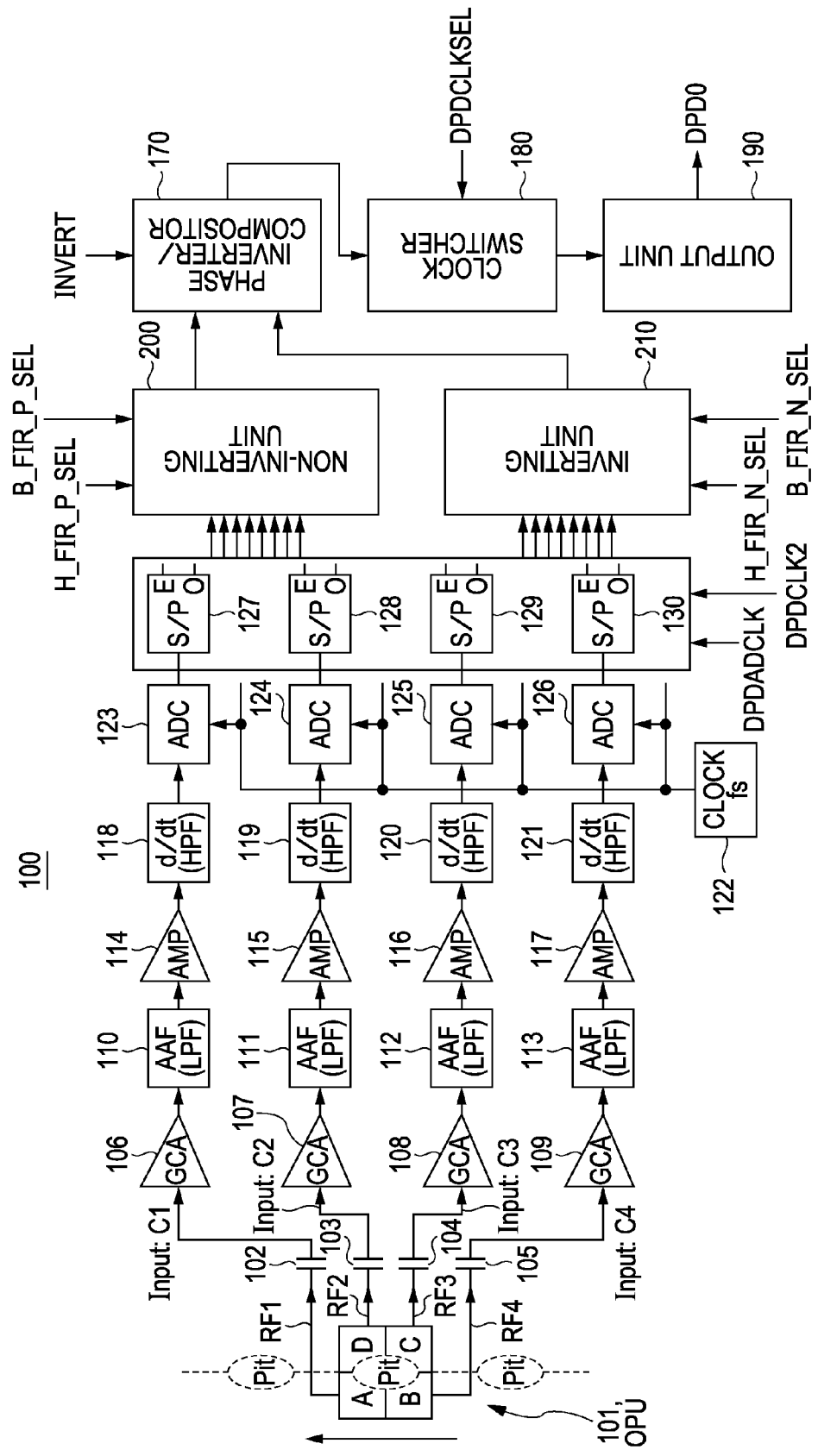
FIG. 1 is a circuit diagram illustrating the configuration of a tracking error signal (TE) detection apparatus adopting a DPD method in accordance with an embodiment of the present invention, with the anterior half shown in detail.
Figure 2:
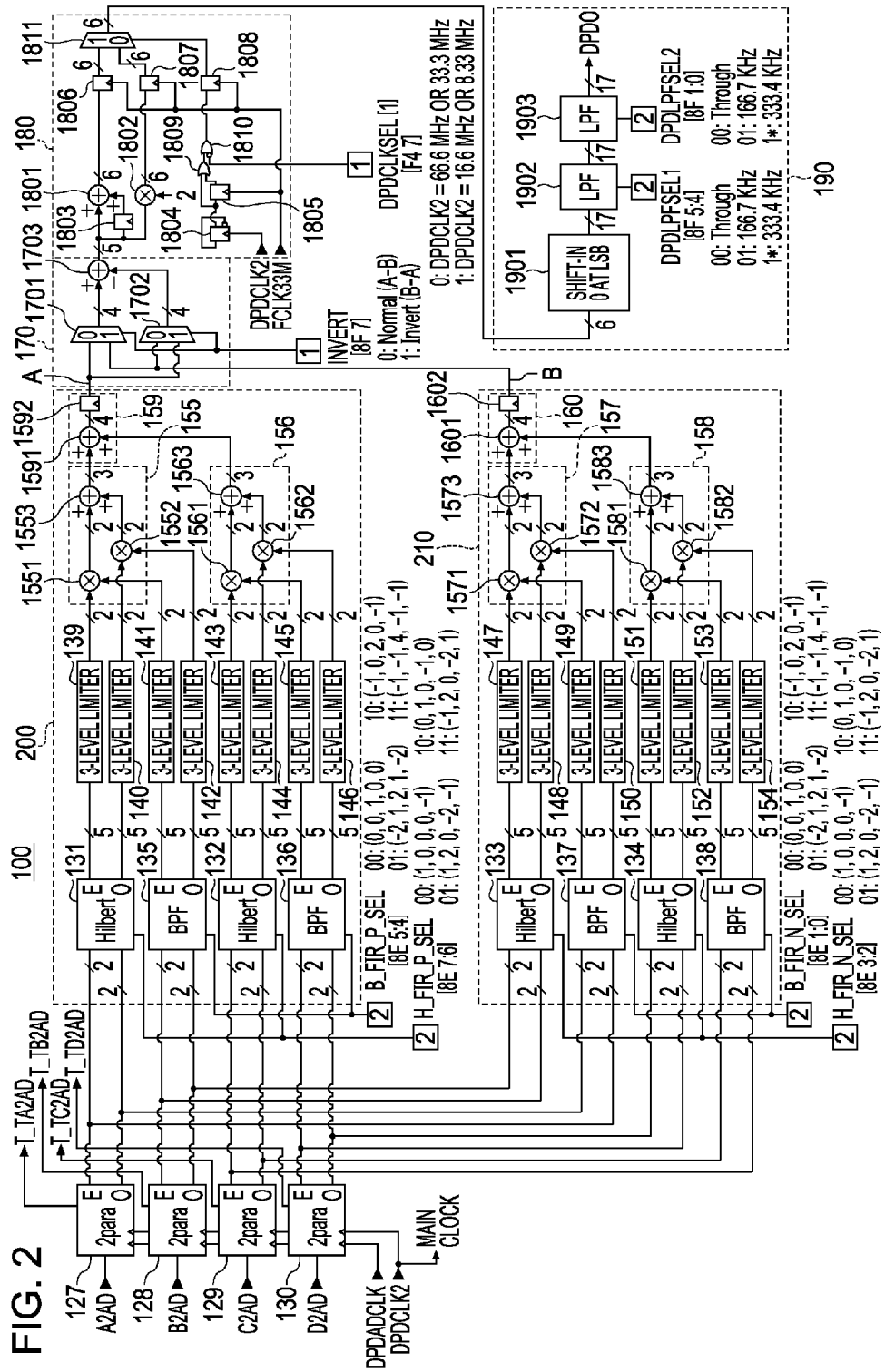
FIG. 2 is a circuit diagram illustrating the configuration of a tracking error (TE) detection apparatus adopting a DPD method in accordance with an embodiment of the present invention, with the posterior half shown in detail.

FIGS. 1 and 2 are circuit diagrams illustrating the configuration of a tracking error signal (TE) detection apparatus adopting a DPD method in accordance with an embodiment of the present invention. FIG. 1 shows the anterior part of the circuit in the TE detection apparatus in detail, while FIG. 2 shows the anterior part of the circuit in the TE detection apparatus in detail.

A TE detection apparatus 100 in accordance with an embodiment of the present invention includes a light-receiving element 101 and first through fourth AC couplers 102 to 105 disposed in an optical pickup (OPU) for an optical disc, as well as first through fourth gain-controlled amplifiers (GCAs) 106 to 109.

The TE detection apparatus 100 furthermore includes first through fourth anti-aliasing filters (AAFs) 110 to 113), first through fourth amplifiers 114 to 117, first through fourth differentiators 118 to 121, a clock generator 122, and first through fourth ADCs 123 to 126.

The TE detection apparatus 100 furthermore includes first through fourth serial/parallel (S/P) converters 127 to 130, first through fourth Hilbert transformers 131 to 134, first through fourth delay circuits 135 to 138, and first through sixteenth 3-level limiters 139 to 154.

The TE detection apparatus 100 furthermore includes first through fourth cross-correlators 155 to 158, first and second adding units 159 and 160, a phase inverter/compositor 170, a clock switcher 180, and an output unit 190.

In the TE detection apparatus 100, the first and second Hilbert transformers 131 and 132, the first and second delay circuits 135 and 136, the first through eighth 3-level limiters 139 to 146, the first and second cross-correlators 155 and 156, and the first adding unit 159 collectively form a non-inverting unit 200.

Additionally, the third and fourth Hilbert transformers 133 and 134, the third and fourth delay circuits 137 and 138, the ninth through sixteenth 3-level limiters 147 to 154, the third and fourth cross-correlators 157 and 158, and the second adding unit 160 collectively form an inverting unit 210.

In this way, the TE detection apparatus 100 in accordance with the present embodiment is provided with a non-inverting unit 200 and an inverting unit 210, and is configured to retrieve differential phase information by correlation detection using a differential Hilbert technique.

Additionally, when retrieving differential phase information by correlation detection using a differential Hilbert technique in the TE detection apparatus 100, differing frequency characteristics are set using a differential inverting pass and non-inverting pass. In so doing, a wide frequency detection range is realized.

In the differential processing herein, the number of differential processes processed in parallel is not limited. Furthermore, differences in frequency settings such as filter tap numbers and coefficients are not limited.

Thus, in the present embodiment, a TE detection apparatus 100 is provided with a non-inverting unit 200 and an inverting unit 210, and is configured to retrieve differential phase information by correlation detection using a differential Hilbert technique. The reasons for this configuration will be described below.

In an optical disc system, if disc rotation is controlled by constant angular velocity (CAV), then the input signal will exhibit a frequency band of ×2.5 between the innermost and outermost edges of the disc.

In order to suppress fluctuations in TE detection sensitivity, a Hilbert filter with a wide fractional band and band-pass filter (BPF) acting as a delay circuit are often used. However, this has the tendency to increase the circuit scale (to 15-tap, for example).

In contrast, if the circuit scale of the Hilbert filter and the BPF is reduced (to 5-tap, for example), then the fractional band of filter becomes narrow, with the Hilbert filter and BPF settings being modified to follow the input frequency. However, this might place additional load on the system.

Consequently, the present embodiment is configured such that the frequency settings of the Hilbert filter and BPF constituting the inverting side of the differential processing can be made to differ from the frequency settings of the Hilbert filter and BPF constituting the non-inverting side. In so doing, the frequency detection range for DPD signals can be widened while still keeping the circuit scale small (at 5-tap, for example).

The configuration and function of a TE detection apparatus 100 having such a feature will now be described in detail.

The light-receiving element 101 is divided into four sections, with the fractional light-receiving element 101-A outputting a first RF signal RF1 to the first AC coupler 102. The fractional light-receiving element 101-B outputs a fourth RF signal RF4 to the fourth AC coupler 105. The fractional light-receiving element 101-C outputs a third RF signal RF3 to the third AC coupler 104. The fractional light-receiving element 101-D outputs a second RF signal RF2 to the AC coupler 103.

The first through fourth AC couplers 102 to 105 are made up of capacitors, for example, and remove the DC components of the first through fourth RF signals RF1 to RF4 whose phase differences (i.e., time differences) with respect to each other vary according to the tracking error output from the light-receiving element 101 of the optical pickup (OPU).

The first GCA 106 adjusts the level of the output signal from the first AC coupler 102 in accordance with the fluctuations in the output level of the light-receiving element 101 of the optical pickup (OPU), and outputs the result to the first AAF 110.

The second GCA 107 adjusts the level of the output signal from the second AC coupler 103 in accordance with the fluctuations in the output level of the light-receiving element 101 of the optical pickup (OPU), and outputs the result to the second AAF 111.

The third GCA 108 adjusts the level of the output signal from the third AC coupler 104 in accordance with the fluctuations in the output level of the light-receiving element 101 of the optical pickup (OPU), and outputs the result to the third AAF 112.

The fourth GCA 109 adjusts the level of the output signal from the fourth AC coupler 105 in accordance with the fluctuations in the output level of the light-receiving element 101 of the optical pickup (OPU), and outputs the result to the fourth AAF 113.

The first AAF 110 band-limits the output from the first GCA 106, prevents folding of the out-of-band components thereof, and outputs the result to the first amplifier 114.

The second AAF 111 band-limits the output from the second GCA 107, prevents folding of the out-of-band components thereof, and outputs the result to the second amplifier 115.

The third AAF 112 band-limits the output from the third GCA 108, prevents folding of the out-of-band components thereof, and outputs the result to the third amplifier 116.

The fourth AAF 113 band-limits the output from the fourth GCA 109, prevents folding of the out-of-band components thereof, and outputs the result to the fourth amplifier 117.

The first through fourth AAFs 110 to 113 are for preventing folding, and in the present embodiment use second-order LPFs. However, the order is arbitrary.

The cutoff frequency of the AAFs 110 to 113 is preferably set as follows, wherein the innermost edge or seek start radius of the optical disc (i.e., recording medium) is taken to be ri, the outermost edge or seek target radius is ro, and wherein ro>ri.

In this case, it is preferable to set the cutoff frequency higher than ro/ri (×2.4, in the case of a 12 cm disc) times the highest repeating RF frequency at the radius ri (2 T=fcck/4 for Blu-ray, and 3 T=fcck/6 for DVDs and CDs, where fcck is the channel clock frequency).

The cutoff frequency is preferably set as described above in order to correctly detect a TE signal even during a full seek operation from the innermost edge to the outermost edge of the disc.

The first amplifier 114 amplifies the output of the first AAF 110 to a predetermined level, and outputs the result to the first differentiator 118.

The second amplifier 115 amplifies the output of the second AAF 111 to a predetermined level, and outputs the result to the second differentiator 119.

The third amplifier 116 amplifies the output of the third AAF 112 to a predetermined level, and outputs the result to the third differentiator 120.

The fourth amplifier 117 amplifies the output of the fourth AAF 113 to a predetermined level, and outputs the result to the fourth differentiator 121.

The first through fourth amplifiers 114 to 117 apply an overscaling effect to the input supplied to the subsequent ADCs 123 to 126.

The gain of the first through fourth amplifiers is determined such that the input amplitude into the ADCs 123 to 126 exceeds the full scale amplitude.

The above is conducted in order to remove amplitude variation components by using the overscale limiting effect of A/D converters, and in addition, to use low bit-number A/D converters by effectively utilizing the quantization resolution. Equivalently, the quantization resolution is allocated only to the zero cross vicinity, which is important for the extraction of differential phase information.

The first through fourth amplifiers 114 to 117 herein may also be respectively coupled to the first through fourth GCAs 106 to 109.

The first differentiator 118 removes the DC component from the output of the first amplifier 114, takes the derivative of the result, and outputs the derivative to the first ADC 123.

The second differentiator 119 removes the DC component from the output of the second amplifier 115, takes the derivative of the result, and outputs the derivative to the second ADC 124.

The third differentiator 120 removes the DC component from the output of the third amplifier 116, takes the derivative of the result, and outputs the derivative to the third ADC 125.

The fourth differentiator 121 removes the DC component from the output of the fourth amplifier 117, takes the derivative of the result, and outputs the derivative to the fourth ADC 126.

The first through fourth differentiators 118 to 121 are for removing the DC offsets from the signal thus far, and additionally, for applying differential characteristics to favorably render a demodulation S/N ratio for the phase demodulator whose detection sensitivity follows the differential curve. The first through fourth differentiators 118 to 121 may be made up of a first-order high pass filter (HPF).

The first ADC 123 constrains the amplitude of, samples, and quantizes the output from the first differentiator 118, and outputs the result to the first serial/parallel converter 127.

The second ADC 124 constrains the amplitude of, samples, and quantizes the output from the second differentiator 119, and outputs the result to the second serial/parallel converter 128.

The third ADC 125 constrains the amplitude of, samples, and quantizes the output from the third differentiator 120, and outputs the result to the third serial/parallel converter 129.

The fourth ADC 126 constrains the amplitude of, samples, and quantizes the output from the fourth differentiator 121, and outputs the result to the fourth serial/parallel converter 130.

The first through fourth ADCs 123 to 126 are driven by the same sampling clock CLK. The sampling clock CLK may be asynchronous with the RF. The sampling frequency of the first through fourth ADCs 123 to 126 is set as follows, wherein the innermost edge or seek start radius of the optical disc (i.e., recording medium) is taken to be ri, the outermost edge or seek target radius is ro, and wherein ro>ri.

In this case, it is preferable to set the sampling frequency higher than 2*(ro/ri) (×4.8, in the case of a 12 cm disc) times the highest repeating RF frequency at the radius ri (2 T=fcck/4 for Blu-ray, and 3 T=fcck/6 for DVDs and CDs, where fcck is the channel clock frequency).

The sampling frequency is preferably set as described above in order to correctly detect a TE signal even during a full seek operation from the innermost edge to the outermost edge of the disc.

In the present embodiment, the first through fourth ADCs 123 to 126 may be substituted with 1-bit latched comparators.

The first serial/parallel converter 127 converts the output from the first ADC 123 from serial data into 2-bit first parallel data (E-side data) and second parallel data (O-side data).

The first serial/parallel converter 127 then outputs the first parallel data (E-side data) and the second parallel data (O-side data) to the first Hilbert transformer 131.

In addition, the first serial/parallel converter 127 outputs the second parallel data (O-side data) and the first parallel data (E-side data) to the third delay circuit 137.

The second serial/parallel converter 128 converts the output from the second ADC 124 from serial data into 2-bit first parallel data (E-side data) and second parallel data (O-side data).

The second serial/parallel converter 128 then outputs the first parallel data (E-side data) and the second parallel data (O-side data) to the first delay circuit 135. In addition, the second serial/parallel converter 128 outputs the second parallel data (O-side data) and the first parallel data (E-side data) to the third Hilbert transformer 133.

The third serial/parallel converter 129 converts the output from the third ADC 125 from serial data into 2-bit first parallel data (E-side data) and second parallel data (O-side data).

The third serial/parallel converter 129 then outputs the first parallel data (E-side data) and the second parallel data (O-side data) to the second Hilbert transformer 132.

In addition, the third serial/parallel converter 129 outputs the second parallel data (O-side data) and the first parallel data (E-side data) to the fourth delay circuit 138.

The fourth serial/parallel converter 130 converts the output from the fourth ADC 126 from serial data into 2-bit first parallel data (E-side data) and second parallel data (O-side data).

The fourth serial/parallel converter 130 then outputs the first parallel data (E-side data) and the second parallel data (O-side data) to the second delay circuit 136.

In addition, the fourth serial/parallel converter 130 outputs the second parallel data (O-side data) and the first parallel data (E-side data) to the fourth Hilbert transformer 134.

The first through fourth serial/parallel converters 127 to 130 conduct serial/parallel conversion synchronous with clocks DPDADCLK and DPDCLK2. The clock DPDADC-CLK is a clock for receiving data from the earlier ADCs, and can be switched to a clock DPDCLKDIV between 133.333 MHz and 16.66 MHz.

The clock DPDCLKDIV is a 2-bit clock, and becomes the clock DPDADCLK upon division (1/1, 1/2, 1/4, and 1/8) of the frequency 133.333 MHz.

The clock DPDCLK2 is the main clock of the present circuit, its frequency being one-half the period of the clock DPDADCLK.

The first through fourth serial/parallel converters 127 to 130 have inputs A2AD, B2AD, C2AD, and D2AD, which are supplied from the earlier ADCs 123 to 126 in 2-bit, 3-value, 2's complement format.

The first Hilbert transformer 131 phase-shifts the first parallel data (E-side data) and the second parallel data (O-side data) of the first serial/parallel converter 127 by 90°, irrespective of the period of the signal (i.e., data) components thereof.

The first Hilbert transformer 131 outputs the phase-shifted, 5-bit first data (E-side data) to the first 3-level limiter 139. In addition, the first Hilbert transformer 131 outputs the phase-shifted, 5-bit second data (O-side data) to the second 3-level limiter 140.

The first delay circuit 135 delays the first parallel data (E-side data) and the second parallel data (O-side data) from the second serial/parallel converter 128 so as to match the delay amount of the first Hilbert transformer 131.

The first delay circuit 135 outputs the delayed, 5-bit first data (E-side data) to the third 3-level limiter 141. In addition, the first delay circuit 135 outputs the delayed, 5-bit second data (O-side data) to the fourth 3-level limiter 142.

The second Hilbert transformer 132 phase-shifts the first parallel data (E-side data) and the second parallel data (O-side data) of the third serial/parallel converter 129 by 90°, irrespective of the period of the signal (i.e., data) components thereof.

The second Hilbert transformer 132 outputs the phase-shifted, 5-bit first data (E-side data) to the fifth 3-level limiter 143. In addition, the second Hilbert transformer 132 outputs the phase-shifted, 5-bit second data (O-side data) to the sixth 3-level limiter 144.

The second delay circuit 136 delays the first parallel data (E-side data) and the second parallel data (O-side data) from the fourth serial/parallel converter 130 so as to match the delay amount of the second Hilbert transformer 132.

The second delay circuit 136 outputs the delayed, 5-bit first data (E-side data) to the seventh 3-level limiter 145. In addition, the second delay circuit 136 outputs the delayed, 5-bit second data (O-side data) to the eighth 3-level limiter 146.

The third Hilbert transformer 133 phase-shifts the second parallel data (O-side data) and the first parallel data (E-side data) of the second serial/parallel converter 128 by 90°, irrespective of the period of the signal (i.e., data) components thereof.

The third Hilbert transformer 133 outputs the phase-shifted, 5-bit first data (E-side data) to the ninth 3-level limiter 147. In addition, the third Hilbert transformer 133 outputs the phase-shifted, 5-bit second data (O-side data) to the tenth 3-level limiter 148.

The third delay circuit 137 delays the second parallel data (O-side data) and the first parallel data (E-side data) from the first serial/parallel converter 127 so as to match the delay amount of third Hilbert transformer 133.

The third delay circuit 137 outputs the delayed, 5-bit first data (E-side data) to the eleventh 3-level limiter 149. In addition, the third delay circuit 137 outputs the delayed, 5-bit second data (O-side data) to the twelfth 3-level limiter 150.

The fourth Hilbert transformer 134 phase-shifts the second parallel data (O-side data) and the first parallel data (E-side data) of the fourth serial/parallel converter 130 by 90°, irrespective of the period of the signal (i.e., data) components thereof.

The fourth Hilbert transformer 134 outputs the phase-shifted, 5-bit first data (E-side data) to the thirteenth 3-level limiter 151. In addition, the fourth Hilbert transformer 134 outputs the phase-shifted, 5-bit second data (O-side data) to the fourteenth 3-level limiter 152.

The fourth delay circuit 138 delays the second parallel data (O-side data) and the first parallel data (E-side data) from the third serial/parallel converter 129 so as to match the delay amount of the fourth Hilbert transformer 134.

The fourth delay circuit 138 outputs the delayed, 5-bit first data (E-side data) to the fifteenth 3-level limiter 153. In addition, the fourth delay circuit 138 outputs the delayed, 5-bit second data (O-side data) to the sixteenth 3-level limiter 154.

The delay circuits 135 to 138 may be realized by means of band-pass filters (BPFs) having amplitude and frequency characteristics equivalent to those of the first through fourth Hilbert transformers 131 to 134.

It should also be appreciated that the first through fourth Hilbert transformers 131 to 134 may be realized by means of FIR filter having the two orthogonal outputs of I (the in-phase component) and Q (the orthogonal component).

Figure 3:
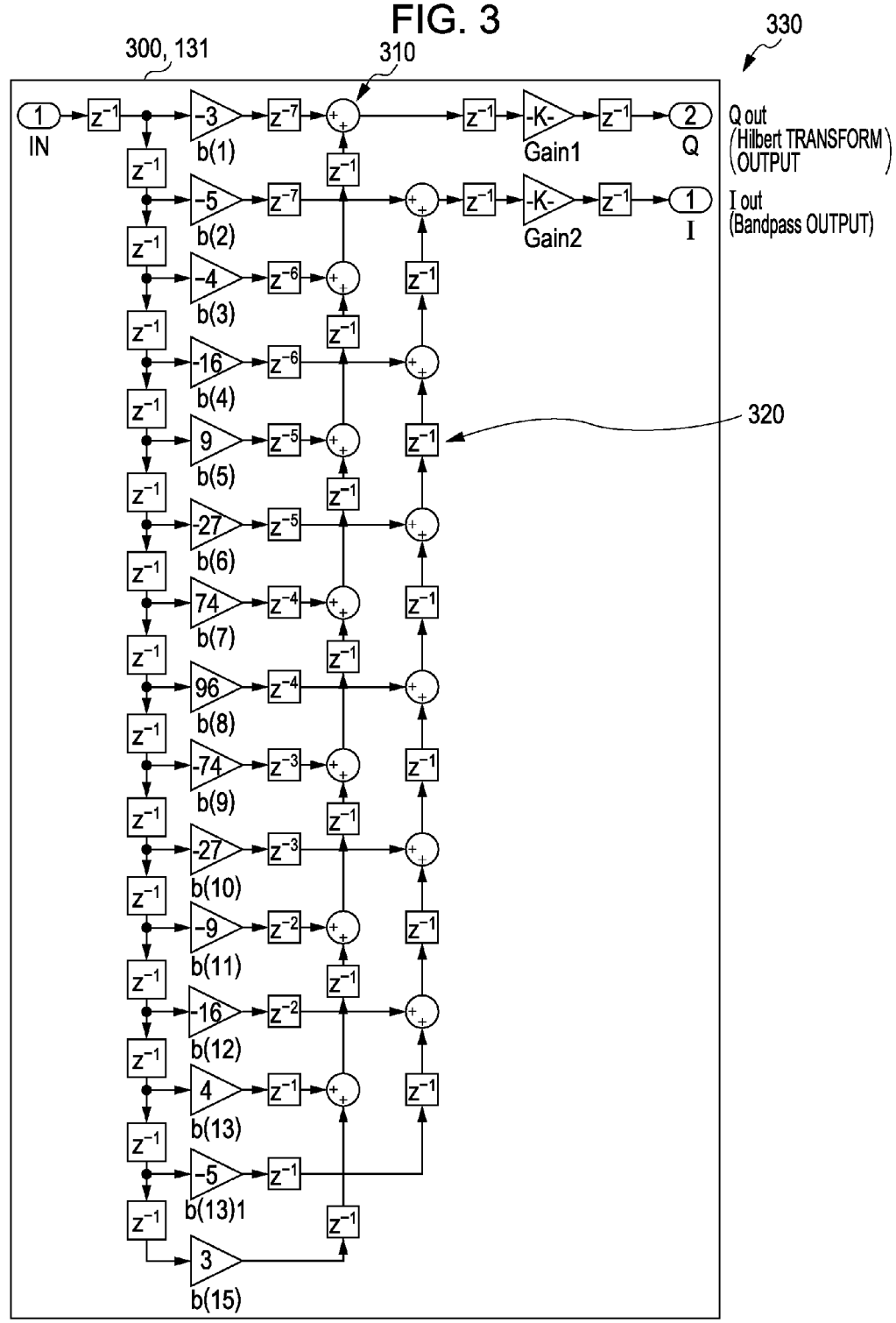
FIG. 3 is a circuit diagram illustrating an exemplary configuration of a Hilbert IQ filter in accordance with an embodiment of the present invention.

FIG. 3 is a circuit diagram illustrating an exemplary configuration of a Hilbert IQ filter 300 in accordance with the present embodiment.

As shown in FIG. 3, the Q output of the Hilbert IQ filter 300 exhibits Hilbert-transformed characteristics, wherein the frequency transfer function of the Hilbert transformation is expressed as follows.

$$H(\omega)=e^{-\pi/2} \ (\omega>0);$$

$$H(\omega)=0 \ (\omega=0, \ 2\pi fs/2);$$

$$H(\omega)=-e^{-\pi/2}(\omega<0) \qquad \text{[Eq. 1]}$$

In other words, a phase shift of 90° ($\pi/2$) is applied irrespective of the signal period. The amplitude characteristics are given by band-pass characteristics that are null at the DC and Nyquist frequencies (fs/2).

The tap coefficients (TAP) of the Hilbert transformers herein may, for example, be given by a point-symmetric coefficient profile that reverses sign about the center tap. Consequently, from the perspective of causal laws, it is not feasible to physically realize the Hilbert transformers herein in analog.

Also, as shown in FIG. 3, the I output of the Hilbert IQ filter 300 is made to have band-pass characteristics with amplitude characteristics equal to those of the Q output. The delay amount is designed to be equivalent to that of the Q output.

The tap coefficients of the band-pass filters herein may, for example, be given by a line-symmetric coefficient profile centered about the center tap. Consequently, from the perspective of causal laws, it is not feasible to physically realize the BPFs herein in analog.

In addition, the amplitude characteristics in the present embodiment are given by band-pass characteristics that are null at the DC and Nyquist frequencies (fs/2). Furthermore, the amplitude characteristics are made to be line-symmetric about the half-Nyquist frequency (fs/4). In so doing, as shown in FIG. 3, every other tap is a zero tap, and in addition, the tap positioning of the Hilbert transformers and the BPFs becomes complementary.

Consequently, as shown in FIG. 3, the first Hilbert transformer 131 and the first delay circuit 135 can be realized by means of a single FIR filter having a dual system of independent taps 310 and 320 and outputs (I, Q) 330 interleaved in a comb array.

Similarly, the second Hilbert transformer 132 and the second delay circuit 136 can be realized by means of a single FIR filter having dual system of independent taps 310 and 320 and outputs (I, Q) 330 interleaved in a comb array.

The third Hilbert transformer 133 and the third delay circuit 137 can be realized by means of a single FIR filter having dual system of independent taps 310 and 320 and outputs (I, Q) 330 interleaved in a comb array.

The fourth Hilbert transformer 134 and the fourth delay circuit 138 can be realized by means of a single FIR filter having dual system of independent taps 310 and 320 and outputs (I, Q) 330 interleaved in a comb array.

In so doing, the implemented circuit scale can be reduced.

With such a configuration, it is still possible to realize a DPD TE detection apparatus as a high-speed, high-precision digital circuit.

In addition, the DPD TE detection apparatus may also be configured to include a first FIR filter substituted for one of the Hilbert transformers and a second FIR filter substituted for one of the BPFs acting as a delay circuit, wherein the differential phase of the outputs from the first and second FIR filters is 90°, irrespective of the signal periods.

More particularly, the phase shift amount of the first FIR filter may be set to +45° (or −45°)irrespective of the signal period, while the phase shift amount of the second FIR filter may be set to −45° (or +45°)irrespective of the signal period.

The non-inverting unit 200 is formed by the first and second Hilbert transformers 131 and 132, the first and second delay circuits 135 and 136, the first through eighth 3-level limiters 139 to 146, the first and second cross-correlators 155 and 156, and the first adding unit 159.

Additionally, the inverting unit 210 is formed by the third and fourth Hilbert transformers 133 and 134, the third and fourth delay circuits 137 and 138, the ninth through sixteenth 3-level limiters 147 to 154, the third and fourth cross-correlators 157 and 158, and the second adding unit 160.

In the present embodiment, it is possible to configure the frequency settings of the Hilbert filter (i.e., transformer) and BPF (acting as a delay circuit) constituting the inverting side of the differential processing differently from the frequency settings of the Hilbert filter and BPF constituting the non-inverting side.

FIGS. 4A to 4D illustrate examples of frequency bands configurable in the Hilbert filters. FIGS. 5A to 5D illustrate examples of frequency bands configurable in the BPFs.

In this way, the frequency settings of the Hilbert filter (i.e., transformer) and BPF constituting the inverting side of the differential processing can be made to differ from the frequency settings of the Hilbert filter and BPF constituting the non-inverting side.

Figure 4A:
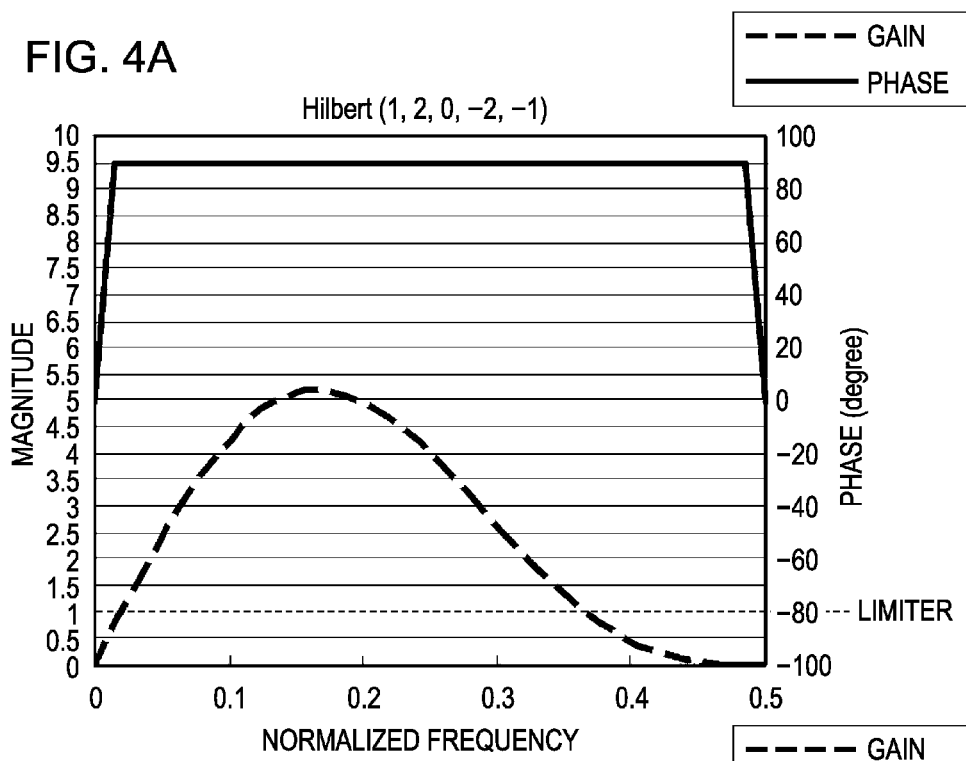
FIG. 4A illustrates an example of a frequency band configurable in a Hilbert filter.
Figure 4B:
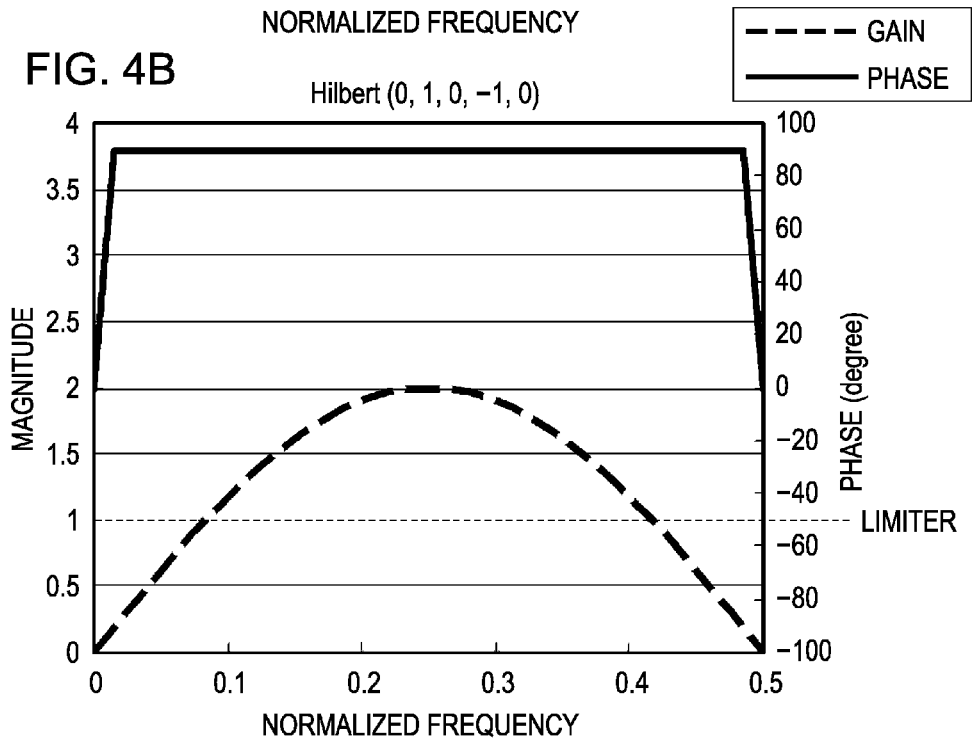
FIG. 4B illustrates an example of a frequency band configurable in a Hilbert filter.
Figure 4C:
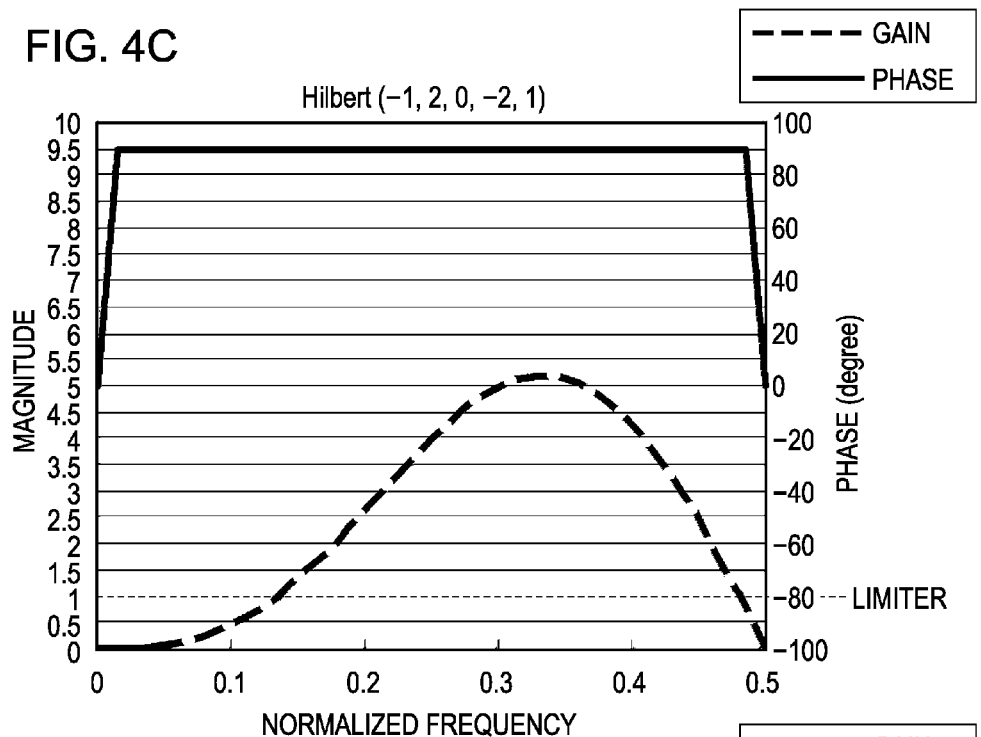
FIG. 4C illustrates an example of a frequency band configurable in a Hilbert filter.
Figure 4D:
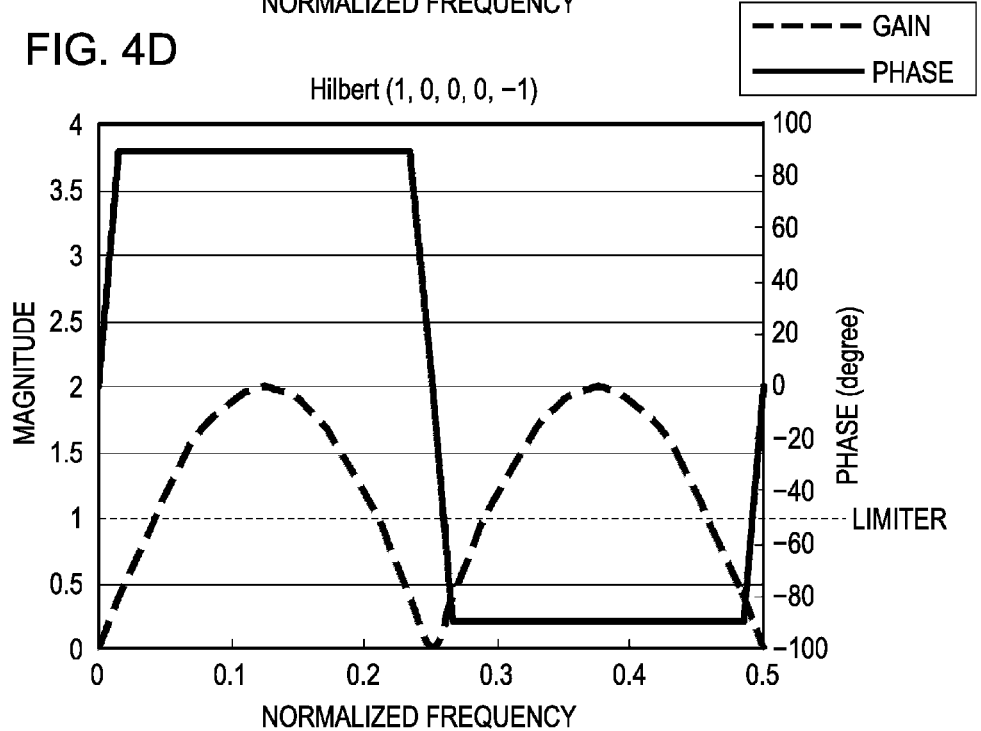
FIG. 4D illustrates an example of a frequency band configurable in a Hilbert filter.
Figure 5A:
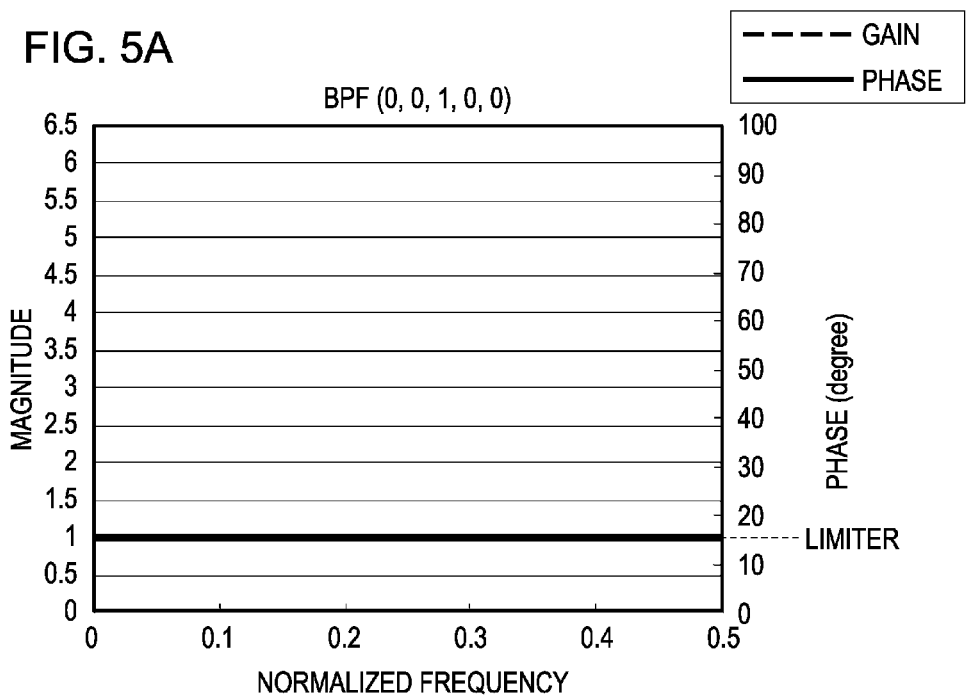
FIG. 5A illustrates an example of a frequency band configurable in a BPF.
Figure 5B:
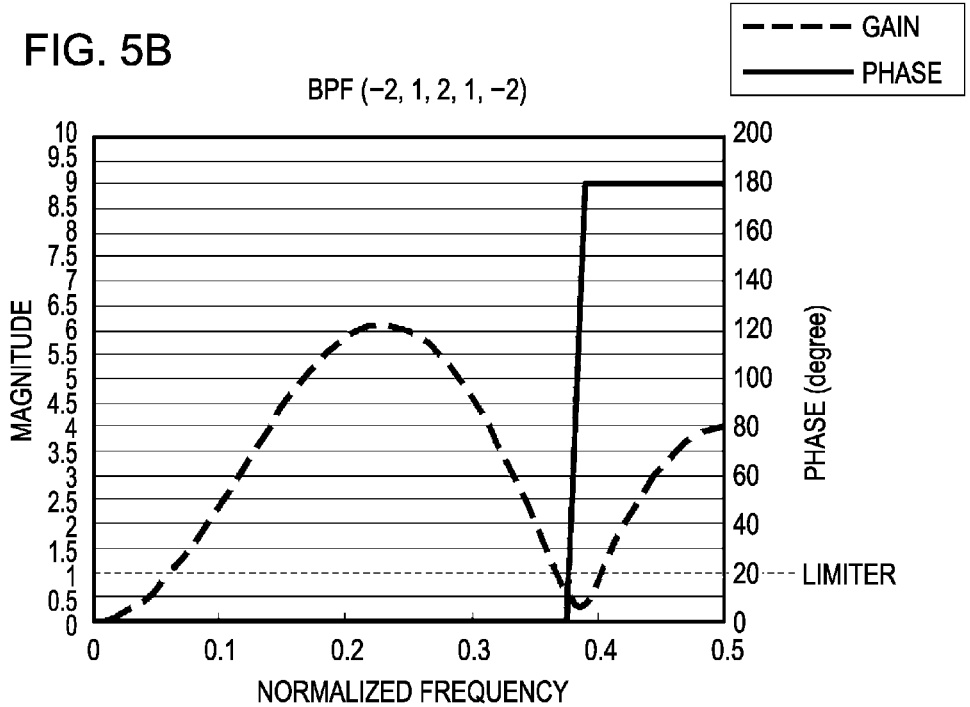
FIG. 5B illustrates an example of a frequency band configurable in a BPF.
Figure 5C:
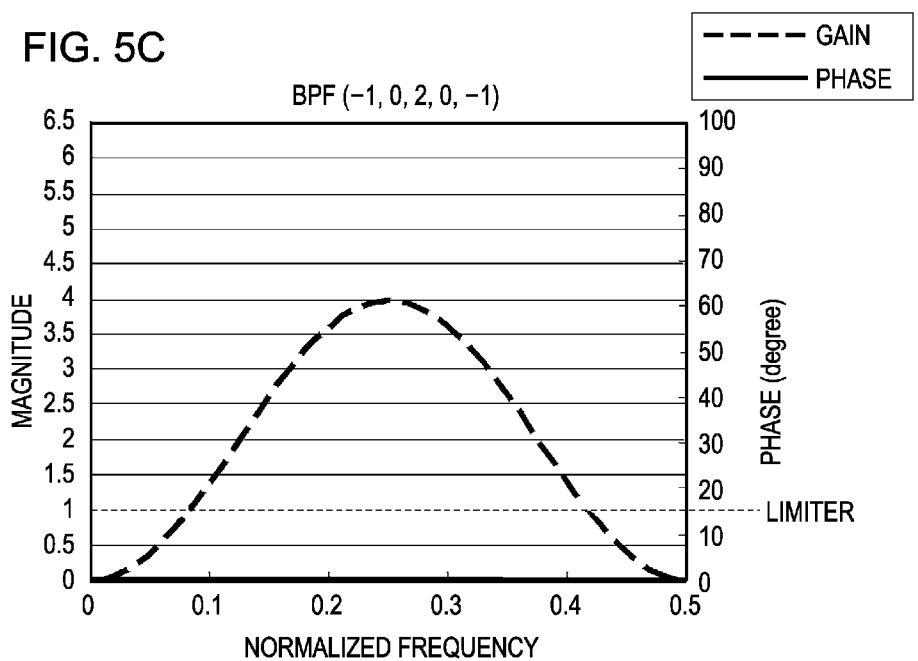
FIG. 5C illustrates an example of a frequency band configurable in a BPF.
Figure 5D:
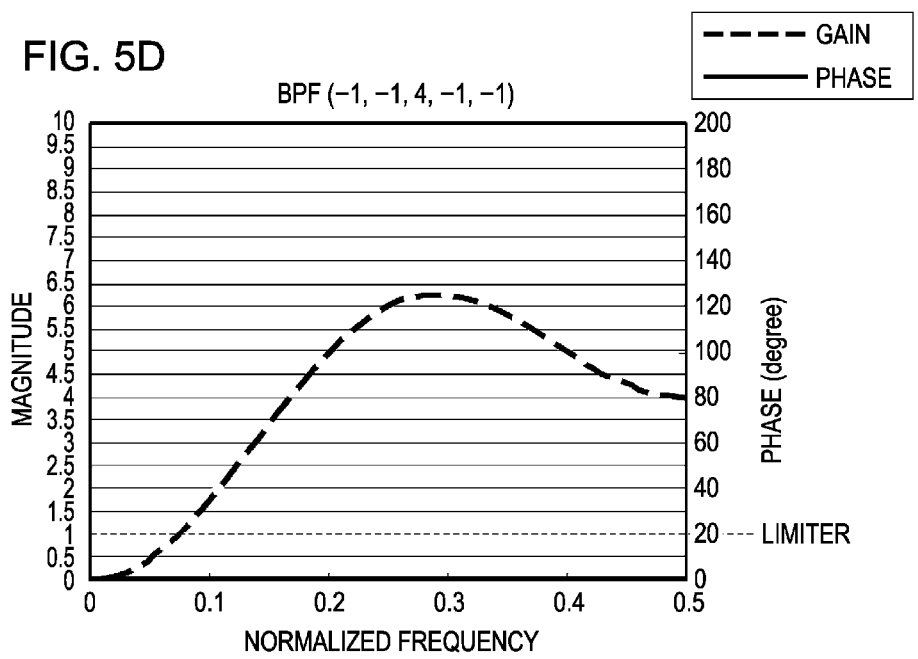
FIG. 5D illustrates an example of a frequency band configurable in a BPF.

More specifically, the Hilbert filter on the non-inverting side is set according to a curve that peaks in the low range, as shown in FIG. 4A, while the Hilbert filter on the inverting side is set according to a curve that peaks in the high range, as shown in FIG. 4B.

In so doing, it becomes possible to widen the overall band of the tracking error signal.

Similarly, it is also possible to appropriately select settings for the BPFs.

In so doing, it becomes possible to widen the frequency detection range for DPD signals while still keeping the circuit scale small (at 5-tap, for example).

In the present embodiment, it is possible for the first and second Hilbert transformers 131 and 132 in the non-inverting unit 200 to appropriately set frequencies using a 2-bit signal H_FIR_P_SEL.

When the signal is (00), the tap coefficients are [1, 0, 0, 0, −1]. When the signal is (01), the tap coefficients are [1, 2, 0, −2, −1]. When the signal is (10), the tap coefficients are [0, 1, 0, −1, 0]. When the signal is (11), the tap coefficients are [−1, 2, 0, −2, 1].

In contrast, it is possible for the third and fourth Hilbert transformers 133 and 134 in the inverting unit 210 to appropriately set frequencies using a 2-bit signal H_FIR_N_SEL.

When the signal is (00), the tap coefficients are [1, 0, 0, 0, −1]. When the signal is (01), the tap coefficients are [1, 2, 0, −2, −1]. When the signal is (10), the tap coefficients are [0, 1, 0, −1, 0]. When the signal is (11), the tap coefficients are [−1, 2, 0, −2, 1].

In this way, different signals can be used to individually configure frequencies in the Hilbert transformers (i.e., Hilbert filters) of the non-inverting unit 200 and the inverting unit 210.

In addition, in the present embodiment, it is possible for the first and second delay circuits 135 and 136 in the non-inverting unit 200 to appropriately set frequencies using a 2-bit signal B_FIR_P_SEL.

When the signal is (00), the tap coefficients are [0, 0, 1, 0, 0]. When the signal is (01), the tap coefficients are [−2, 1, 2, 1, −2]. When the signal is (10), the tap coefficients are [−1, 0, 2, 0, −1]. When the signal is (11), the tap coefficients are [−1, −1, 4, −1, −1].

In contrast, it is possible for the third and fourth delay circuits 137 and 138 in the inverting unit 210 to appropriately set frequencies using a 2-bit signal B_FIR_N_SEL.

When the signal is (00), the tap coefficients are [0, 0, 1, 0, 0]. When the signal is (01), the tap coefficients are [−2, 1, 2, 1, −2]. When the signal is (10), the tap coefficients are [−1, 0, 2, 0, −1]. When the signal is (11), the tap coefficients are [−1, −1, 4, −1, −1].

In this way, different signals can be used to individually configure frequencies in the BPFs of the non-inverting unit 200 and the inverting unit 210.

The first 3-level limiter 139 limits the level of the 5-bit first data (E-side data) from the first Hilbert transformer 131, and outputs the result to the first cross-correlator 155 as 2-bit data taking the three levels (01, 00, 10).

The second 3-level limiter 140 limits the level of the 5-bit second data (O-side data) from the first Hilbert transformer 131, and outputs the result to the first cross-correlator 155 as 2-bit data taking the three levels (01, 00, 10).

The third 3-level limiter 141 limits the level of the 5-bit first data (E-side data) from the first delay circuit 135, and outputs the result to the first cross-correlator 155 as 2-bit data taking the three levels (01, 00, 10).

The fourth 3-level limiter 142 limits the level of the 5-bit second data (O-side data) from the first delay circuit 135, and outputs the result to the first cross-correlator 155 as 2-bit data taking the three levels (01, 00, 10).

The fifth 3-level limiter 143 limits the level of the 5-bit first data (E-side data) from the second Hilbert transformer 132, and outputs the result to the second cross-correlator 156 as 2-bit data taking the three levels (01, 00, 10).

The sixth 3-level limiter 144 limits the level of the 5-bit second data (O-side data) from the second Hilbert transformer 132, and outputs the result to the second cross-correlator 156 as 2-bit data taking the three levels (01, 00, 10).

The seventh 3-level limiter 145 limits the level of the 5-bit first data (E-side data) from the second delay circuit 136, and outputs the result to the second cross-correlator 156 as 2-bit data taking the three levels (01, 00, 10).

The eighth 3-level limiter 146 limits the level of the 5-bit second data (O-side data) from the second delay circuit 136, and outputs the result to the second cross-correlator 156 as 2-bit data taking the three levels (01, 00, 10).

The ninth 3-level limiter 147 limits the level of the 5-bit first data (E-side data) from the third Hilbert transformer 133, and outputs the result to the third cross-correlator 157 as 2-bit data taking the three levels (01, 00, 10).

The tenth 3-level limiter 148 limits the level of the 5-bit second data (O-side data) from the third Hilbert transformer 133, and outputs the result to the third cross-correlator 157 as 2-bit data taking the three levels (01, 00, 10).

The eleventh 3-level limiter 149 limits the level of the 5-bit first data (E-side data) from the third delay circuit 137, and outputs the result to the third cross-correlator 157 as 2-bit data taking the three levels (01, 00, 10).

The twelfth 3-level limiter 150 limits the level of the 5-bit second data (O-side data) from the third delay circuit 137, and outputs the result to the third cross-correlator 157 as 2-bit data taking the three levels (01, 00, 10).

The thirteenth 3-level limiter 151 limits the level of the 5-bit first data (E-side data) from the fourth Hilbert transformer 134, and outputs the result to the fourth cross-correlator 158 as 2-bit data taking the three levels (01, 00, 10).

The fourteenth 3-level limiter 152 limits the level of the 5-bit second data (O-side data) from the fourth Hilbert transformer 134, and outputs the result to the fourth cross-correlator 158 as 2-bit data taking the three levels (01, 00, 10).

The fifteenth 3-level limiter 153 limits the level of the 5-bit first data (E-side data) from the fourth delay circuit 138, and outputs the result to the fourth cross-correlator 158 as 2-bit data taking the three levels (01, 00, 10).

The sixteenth 3-level limiter 154 limits the level of the 5-bit second data (O-side data) from the fourth delay circuit 138, and outputs the result to the fourth cross-correlator 158 as 2-bit data taking the three levels (01, 00, 10).

Figure 6:
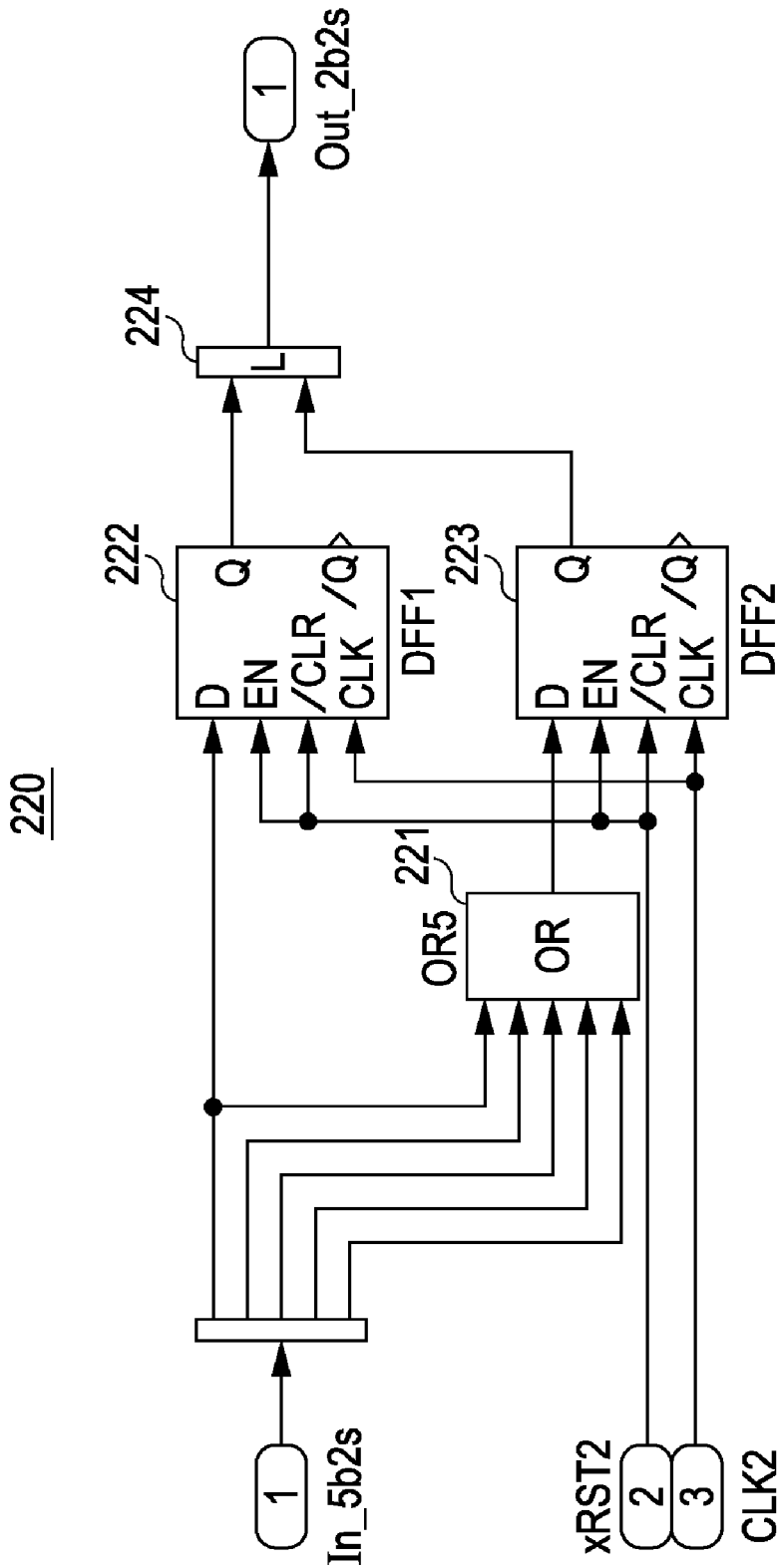
FIG. 6 illustrates an exemplary configuration of a 3-level limiter in accordance with an embodiment of the present invention.

FIG. 6 illustrates an exemplary configuration of a 3-level limiter in accordance with the present embodiment. The 3-level limiter 220 (equivalent to the 3-level limiters 139 to 154) includes a 5-input OR circuit 221, D flip-flops (DFFs) 222 and 223, and a selector 224.

The 3-level limiter 220 passes a 5-bit, 2's complement input signal through the OR circuit 221, the D flip-flops (DFFs) 222 and 223, and the selector 224 to obtain a 2-bit, 2's complement output signal. The output signal is a 3-level signal, taking the levels 01, 00, and 11.

The first cross-correlator 155 respectively computes correlation coefficients expressing the differential phase of the input RF signal from the outputs of the first and second 3-level limiters 139 and 140, and from the outputs of the third and fourth 3-level limiters 141 and 142. The results are added together and output.

In other words, the first cross-correlator 155 computes respective correlation coefficients expressing the differential phase of the input RF signal from the output of the first Hilbert transformer 131, and from the output of the first delay circuit 135. The results are then added together and output.

The first cross-correlator 155 includes multipliers 1551 and 1552, as well as an adder 1553. The multiplier 1551 multiplies the output of the first 3-level limiter 139 by the output of the third 3-level limiter 141, and outputs the result to the adder 1553. The multiplier 1552 multiplies the output of the second 3-level limiter 140 by the output of the fourth 3-level limiter 142, and outputs the result to the adder 1553. The adder 1553 adds together the output of the multiplier 1551 and the output of the multiplier 1552, and outputs the result to the first adding unit 159.

The second cross-correlator 156 respectively computes correlation coefficients expressing the differential phase of the input RF signal from the outputs of the fifth and sixth 3-level limiters 143 and 144, and from the outputs of the seventh and eighth 3-level limiters 145 and 146. The results are added together and output.

In other words, the second cross-correlator 156 computes respective correlation coefficients expressing the differential phase of the input RF signal from the output of the second Hilbert transformer 132, and from the output of the second delay circuit 136. The results are then added together as 3-bit data and output.

The second cross-correlator 156 includes multipliers 1561 and 1562, as well as an adder 1563. The multiplier 1561 multiplies the output of the fifth 3-level limiter 143 by the output of the seventh 3-level limiter 145, and outputs the result to the adder 1563. The multiplier 1562 multiplies the output of the sixth 3-level limiter 144 by the output of the eighth 3-level limiter 146, and outputs the result to the adder 1563. The adder 1563 adds together the output of the multiplier 1561 and the output of the multiplier 1562, and outputs the result to the first adding unit 159.

The third cross-correlator 157 respectively computes correlation coefficients expressing the differential phase of the input RF signal from the outputs of the ninth and tenth 3-level limiters 147 and 148, and from the outputs of the eleventh and twelfth 3-level limiters 149 and 150. The results are added together and output.

In other words, the third cross-correlator 157 computes respective correlation coefficients expressing the differential phase of the input RF signal from the output of the third Hilbert transformer 133, and from the output of the third delay circuit 137. The results are then added together as 3-bit data and output.

The third cross-correlator 157 includes multipliers 1571 and 1572, as well as an adder 1573. The multiplier 1571 multiplies the output of the ninth 3-level limiter 147 by the output of the eleventh 3-level limiter 149, and outputs the result to the adder 1573. The multiplier 1572 multiplies the output of the tenth 3-level limiter 148 by the output of the twelfth 3-level limiter 150, and outputs the result to the adder 1573. The adder 1573 adds together the output of the multiplier 1571 and the output of the multiplier 1572, and outputs the result to the second adding unit 160 as 3-bit data.

The fourth cross-correlator 158 respectively computes correlation coefficients expressing the differential phase of the input RF signal from the outputs of the thirteenth and fourteenth 3-level limiters 151 and 152, and from the outputs of the fifteenth and sixteenth 3-level limiters 153 and 154. The results are added together and output.

In other words, the fourth cross-correlator 158 computes respective correlation coefficients expressing the differential phase of the input RF signal from the output of the fourth Hilbert transformer 134, and from the output of the fourth delay circuit 138. The results are then added together and output.

The fourth cross-correlator 158 includes multipliers 1581 and 1582, as well as an adder 1583. The multiplier 1581 multiplies the output of the thirteenth 3-level limiter 151 by the output of the fifteenth 3-level limiter 153, and outputs the result to the adder 1583. The multiplier 1582 multiplies the output of the fourteenth 3-level limiter 152 by the output of the sixteenth 3-level limiter 154, and outputs the result to the adder 1583. The adder 1583 adds together the output of the multiplier 1581 and the output of the multiplier 1582, and outputs the result to the second adding unit 160 as 3-bit data.

The first adding unit 159 adds together the output of the first cross-correlator 155 and the output of the second cross-correlator 156, and then outputs the added data to the phase inverter/compositor 170.

The first adding unit 159 includes an adder 1591 and a flip-flop (FF) 1592. The adder 1591 adds together the output of the first cross-correlator 155 and the output of the second cross-correlator 156, and then outputs the added 4-bit data to the FF 1592. The FF 1592 temporarily latches the data from the adder 1591, and then outputs the data to the phase inverter/compositor 170 as the output signal A of the non-inverting unit 200.

The second adding unit 160 adds together the output of the third cross-correlator 157 and the output of the fourth cross-correlator 158, and then outputs the added data to the phase inverter/compositor 170.

The second adding unit 160 includes an adder 1601 and a flip-flop (FF) 1602. The adder 1601 adds together the output of the third cross-correlator 157 and the output of the fourth cross-correlator 158, and then outputs the added 4-bit data to the FF 1602. The FF 1602 temporarily latches the data from the adder 1601, and then outputs the data to the phase inverter/compositor 170 as the output signal B of the non-inverting unit inverting unit 210.

In an FIR filter, I and Q are computed in a complementary manner, and thus the expected values of the correlation coefficients CC1 and CC2 are equal with opposite polarity.

On the other hand, the integral residue of the correlation units (i.e., the noise components) have a 90° differential phase, and thus become non-correlated with each other. Consequently, by differentially compositing the correlation coefficients CC1 and CC2, the TE component is doubled, while the noise component is reduced by $\sqrt{2}$. As a result, the S/N ratio of the TE signal can be improved by 3 dB.

In accordance with the level of a control signal INVERT, the phase inverter/compositor 170 inverts or leaves as-is the phase of the output signal A from the non-inverting unit 200 and the output signal B from the inverting unit 210, composites the two signals by addition or subtraction, and outputs the result to the clock switcher 180.

The phase inverter/compositor 170 includes selectors 1701 and 1702, as well as a subtractor 1703. The selector 1701 is supplied with the output signal A from the non-inverting unit 200 at a first input, and with the output signal B from the inverting unit 210 at a second input. The selector 1702 is supplied with the output signal B from the inverting unit 210 at a first input, and with the output signal A from the non-inverting unit 200 at a second input.

If the control signal INVERT has a low level of 0, then the selector 1701 selects the output signal A from the non-inverting unit 200 at the first input, and outputs the signal to the (+) terminal of the subtractor 1703.

If the control signal INVERT has a high level of 1, then the selector 1701 selects the output signal B from the inverting unit 210 at the second input, and outputs the signal to the (+) terminal of the subtractor 1703.

If the control signal INVERT has a low level of 0, then the selector 1702 selects the output signal B from the inverting unit 210 at the first input, and outputs the signal to the (−) terminal of the subtractor 1703.

If the control signal INVERT has a high level of 1, then the selector 1702 selects the output signal A from the non-inverting unit 200 at the second input, and outputs the signal to the (−) terminal of the subtractor 1703.

The subtractor 1703 subtracts the signal W input at the (−) terminal from the signal input at the (+) terminal, and outputs the resulting 5-bit data to the clock switcher 180.

Thus, when the control signal INVERT has a low level of 0, the phase inverter/compositor 170 operates normally, with the subtractor 1703 subtracting the output signal B of the inverting unit 210 from the output signal A of the non-inverting unit 200, and outputting the resulting signal [A-B].

When the control signal INVERT has a high level of 1, the phase inverter/compositor 170 operates inversely, with the subtractor 1703 subtracting the output signal A of the non-inverting unit 200 from the output signal B of the inverting unit 210, and outputting the resulting signal [B-A].

The clock switcher 180 switches the clock of the output signal from the phase inverter/compositor 170 to the clock DPDCLK2 in accordance with a control signal DPDCLK-SEL, and outputs the resulting 6-bit signal to the output unit 190.

The clock switcher 180 includes an adder 1801, a multiplier 1802, FFs 1803 and 1804, FFs 1805 to 1808, an exclusive OR gate (EXOR) 1809, an OR gate 1810, and a selector 1811.

The FF 1803 and the FF 1804 latch data synchronously with the clock DPDCLK2. The FFs 1805 to 1808 latch data synchronously with a clock FCLK33M.

The control signal DPDCLKSEL is supplied to the negative input of the OR gate 1810. When the control signal DPDCLKSEL has a low level of 0, the frequency of the clock DPDCLK2 is 66.667 MHz (fs=133.333 M) or 33.333 MHz (fs=66.667 M). When the control signal DPDCLKSEL has a high level of 1, the frequency of the clock DPDCLK2 is 16.667 MHz (fs=33.333 M) or 8.333 MHz (fs=16.667 M).

In the present embodiment, the method for processing output data differs according to the frequency settings of the clock DPDCLK2. If the frequency of the clock DPDCLK2 is 66.667 MHz, then a 2-sample moving average is taken, 2 down sampled using the clock FCLK33M, and output. If the frequency of the clock DPDCLK2 is 33.333 MHz, then a 2-sample moving average is taken and output. If the frequency of the clock DPDCLK2 is 16.667 MHz, then the mean value interpolation is conducted, loaded onto the clock FCLK33M, and output. If the frequency of the DPDCLK2 is 8.333 MHz, then the inflection point is taken as the interpolated mean, with all other points held to their previous values.

The output unit 190 smoothes the output signal from the clock switcher 180 and outputs the result as the signal DPDO (TE).

The output unit 190 includes a bit processor 1901, and low-pass filters (LPFs) 1902 and 1903.

The bit processor 1901 shifts in a 0 at the least-significant 01 bit of the output signal from the clock switcher 180. The 6-bit signal is converted to a 17-bit signal and output to the LPF 1902.

The LPF 1902 conducts smoothing processing, with the passband being controlled by a 2-bit control signal DPDLPFSEL1. When the control signal DPDLPFSEL1 is (00), the LPF 1902 passes the input signal. When the control signal DPDLPFSEL1 is (01), the LPF 1902 controls the band to 166.7 kHz, and when (1*; i.e., 10 or 11), the LPF 1902 controls the band to 333.4 kHz.

The LPF 1903 conducts smoothing processing, with the passband being controlled by a 2-bit control signal DPDLPFSEL2. When the control signal DPDLPFSEL2 is (00), the LPF 1903 passes the input signal. When the control signal DPDLPFSEL2 is (01), the LPF 1903 controls the band to 166.7 kHz, and when (1*; i.e., 10 or 11), the LPF 1903 controls the band to 333.4 kHz.

In this way, in the output unit 190, the output signal is rendered in a 17-bit, 2's complement format, and output by the LPFs in two stages.

The operation of an apparatus having the above configuration will now be described.

The light-receiving element 101 is divided into four sections, with the fractional light-receiving element 101-A outputting a first RF signal RF1 to the first AC coupler 102. Similarly, the fractional light-receiving element 101-B outputs a fourth RF signal RF4 to the fourth AC coupler 105. The fractional light-receiving element 101-C outputs a third RF signal RF3 to the third AC coupler 104. The fractional light-receiving element 101-D outputs a second RF signal RF2 to the AC coupler 103.

In the first through fourth AC couplers 102 to 105, DC components are removed from the first through fourth RF signals RF1 to RF4, whose phase differences (i.e., time differences) with respect to each other vary according to the tracking error output from the light-receiving element 101 of the optical pickup (OPU). Subsequently, the DC-removed signals are respectively output to the first through fourth GCAs 106 to 109.

In the first GCA 106, the level of the output signal from the first AC coupler 102 is adjusted in accordance with the fluctuations in the output level of the light-receiving element 101 of the optical pickup (OPU), and the result is output to the first AAF 110.

Similarly, in the second GCA 107, the level of the output signal from the second AC coupler 103 is adjusted in accordance with the fluctuations in the output level of the light-receiving element 101 of the optical pickup (OPU), and the result is output to the second AAF 111.

In the third GCA 108, the level of the output signal from the third AC coupler 104 is adjusted in accordance with the fluctuations in the output level of the light-receiving element 101 of the optical pickup (OPU), and the result is output to the third AAF 112.

In the fourth GCA 109, the level of the output signal from the fourth AC coupler 105 is adjusted in accordance with the fluctuations in the output level of the light-receiving element 101 of the optical pickup (OPU), and the result is output to the fourth AAF 113.

In the first AAF 110, the output from the first GCA 106 is band-limited to prevent folding of out-of-band components, amplified by the first amplifier 114, and then output to the first differentiator 118.

In addition, in the second AAF 111, the output from the second GCA 107 is band-limited to prevent folding of out-of-band components, amplified by the second amplifier 115, and then output to the second differentiator 119.

In the third AAF 112, the output from the third GCA 108 is band-limited to prevent folding of out-of-band components, amplified by the third amplifier 116, and then output to the third differentiator 120.

In the fourth AAF 113, the output from the fourth GCA 109 is band-limited to prevent folding of out-of-band components, amplified by the fourth amplifier 117, and then output to the fourth differentiator 121.

In the first differentiator 118, the DC component is removed from the output of the first amplifier 114, and the derivative of the result is computed and output to the first ADC 123.

In addition, in the second differentiator 119, the DC component is removed from the output of the second amplifier 115, and the derivative of the result is computed and output to the second ADC 124.

In the third differentiator 120, the DC component is removed from the output of the third amplifier 116, and the derivative of the result is computed and output to the third ADC 125.

In the fourth differentiator 121, the DC component is removed from the output of the fourth amplifier 117, and the derivative of the result is computed and output to the fourth ADC 126.

Subsequently, in the first ADC 123, the output from the first differentiator 118 is amplitude-constrained, sampled, and quantized, with the result being output to the first serial/parallel converter 127 as a digital signal.

Similarly, in the second ADC 124, the output from the second differentiator 119 is amplitude-constrained, sampled, and quantized, with the result being output to the second serial/parallel converter 128 as a digital signal.

In the third ADC 125, the output from the third differentiator 120 is amplitude-constrained, sampled, and quantized, with the result being output to the third serial/parallel converter 129 as a digital signal.

In the fourth ADC 126, the output from the fourth differentiator 121 is amplitude-constrained, sampled, and quantized, with the result being output to the fourth serial/parallel converter 130 as a digital signal.

In the first serial/parallel converter 127, the output from the first ADC 123 is converted from serial data into 2-bit first parallel data (E-side data) and second parallel data (O-side data).

The first parallel data (E-side data) and the second parallel data (O-side data) thus converted by the first serial/parallel converter 127 are output to the first Hilbert transformer 131. In addition, the second parallel data (O-side data) and the first parallel data (E-side data) are output to the third delay circuit 137.

In the second serial/parallel converter 128, the output from the second ADC 124 is converted from serial data into 2-bit first parallel data (E-side data) and second parallel data (O-side data).

The first parallel data (E-side data) and the second parallel data (O-side data) thus converted by the second serial/parallel converter 128 are output to the first delay circuit 135. In addition, the second parallel data (O-side data) and the first parallel data (E-side data) are output to the third Hilbert transformer 133.

In the third serial/parallel converter 129, the output from the third ADC 125 is converted from serial data into 2-bit first parallel data (E-side data) and second parallel data (O-side data).

The first parallel data (E-side data) and the second parallel data (O-side data) thus converted by the third serial/parallel converter 129 are output to the second Hilbert transformer 132. In addition, the second parallel data (O-side data) and the first parallel data (E-side data) are output to the fourth delay circuit 138.

In the fourth serial/parallel converter 130, the output from the fourth ADC 126 is converted from serial data into 2-bit first parallel data (E-side data) and second parallel data (O-side data).

The first parallel data (E-side data) and the second parallel data (O-side data) thus converted by the fourth serial/parallel converter 130 are output to the second delay circuit 136. In addition, the second parallel data (O-side data) and the first parallel data (E-side data) are output to the fourth Hilbert transformer 134.

In this way, the non-inverting unit 200 and the inverting unit 210 are supplied with mutual reverse-phase digital data, and differential processing is then conducted by the non-inverting unit 200 and the inverting unit 210.

Furthermore, the frequency settings of the Hilbert filter and BPF constituting the inverting side of the differential processing are configured to be different from the frequency settings of the Hilbert filter and BPF constituting the non-inverting side.

The following processing is conducted in the non-inverting unit 200.

In the first Hilbert transformer 131, the first parallel data (E-side data) and the second parallel data (O-side data) from the first serial/parallel converter 127 are phase-shifted by 90°, irrespective of the period of the signal (i.e., data) components thereof.

The 5-bit first data (E-side data) thus phase-shifted by the first Hilbert transformer 131 is output to the first 3-level limiter 139. In addition, the phase-shifted, 5-bit second data (O-side data) is output to the second 3-level limiter 140.

In the first delay circuit 135, the first parallel data (E-side data) and the second parallel data (O-side data) from the second serial/parallel converter 128 are delayed so as to match the delay amount of the first Hilbert transformer 131.

The 5-bit first data (E-side data) thus delayed by the first delay circuit 135 is output to the third 3-level limiter 141. In addition, the delayed, 5-bit second data (O-side data) is output to the fourth 3-level limiter 142.

In the second Hilbert transformer 132, the first parallel data (E-side data) and the second parallel data (O-side data) from the third serial/parallel converter 129 are phase-shifted by 90°, irrespective of the period of the signal (i.e., data) components thereof.

The 5-bit first data (E-side data) thus phase-shifted by the second Hilbert transformer 132 is output to the fifth 3-level limiter 143. In addition, the phase-shifted, 5-bit second data (O-side data) is output to the sixth 3-level limiter 144.

In the second delay circuit 136, the first parallel data (E-side data) and the second parallel data (O-side data) from the fourth serial/parallel converter 130 are delayed so as to match the delay amount of the second Hilbert transformer 132.

The 5-bit first data (E-side data) thus delayed by the second delay circuit 136 is output to the seventh 3-level limiter 145. In addition, the delayed, 5-bit second data (O-side data) is output to the eighth 3-level limiter 146.

The data that was converted from 5-bit to 2-bit data and thus limited to three levels by the first through fourth 3-level limiters 139 to 142 is output to the first cross-correlator 155.

In addition, the data that was converted from 5-bit to 2-bit data and thus limited to three levels by the fifth through eighth 3-level limiters 143 to 146 is output to the second cross-correlator 156.

In the first cross-correlator 155, correlation coefficients are respectively computed, the correlation coefficients expressing the differential phase of the input RF signal from the outputs of the first and second 3-level limiters 139 and 140, and from the outputs of the third and fourth 3-level limiters 141 and 142. The computed results are added together in the first cross-correlator 155 and output to the first adding unit 159.

In the second cross-correlator 156, correlation coefficients are respectively computed, the correlation coefficients expressing the differential phase of the input RF signal from the outputs of the fifth and sixth 3-level limiters 143 and 144, and from the outputs of the seventh and eighth 3-level limiters 145 and 146. The computed results are added together in the second cross-correlator 156 and output to the first adding unit 159.

In the first adding unit 159, the output of the first cross-correlator 155 and the output of the second cross-correlator 156 are added together, and the added data signal A is output to the phase inverter/compositor 170.

The following processing is conducted in the inverting unit 210.

In the third Hilbert transformer 133, the second parallel data (O-side data) and the first parallel data (O-side data) from the second serial/parallel converter 128 are phase-shifted by 90°, irrespective of the period of the signal (i.e., data) components thereof.

The 5-bit first data (E-side data) thus phase-shifted by the third Hilbert transformer 133 is output to the ninth 3-level limiter 147. In addition, the phase-shifted, 5-bit second data (O-side data) is output to the tenth 3-level limiter 148.

In the third delay circuit 137, the second parallel data (O-side data) and the first parallel data (E-side data) from the first serial/parallel converter 127 are delayed so as to match the delay amount of the third Hilbert transformer 133.

The 5-bit first data (E-side data) thus delayed by the third delay circuit 137 is output to the eleventh 3-level limiter 149. In addition, the delayed, 5-bit second data (O-side data) is output to the twelfth 3-level limiter 150.

In the fourth Hilbert transformer 134, the second parallel data (O-side data) and the first parallel data (E-side data) from the fourth serial/parallel converter 130 are phase-shifted by 90°, irrespective of the period of the signal (i.e., data) components thereof.

The 5-bit first data (E-side data) thus phase-shifted by the fourth Hilbert transformer 134 is output to the thirteenth 3-level limiter 151. In addition, the phase-shifted, 5-bit second data (O-side data) is output to the fourteenth 3-level limiter 152.

In the fourth delay circuit 138, the second parallel data (O-side data) and the first parallel data (E-side data) from the third serial/parallel converter 129 are delayed so as to match the delay amount of the fourth Hilbert transformer 134.

The 5-bit first data (E-side data) thus delayed by the fourth delay circuit 138 is output to the fifteenth 3-level limiter 153. In addition, the delayed, 5-bit second data (O-side data) is output to the sixteenth 3-level limiter 154.

The data that was converted from 5-bit to 2-bit data and thus limited to three levels by the ninth through twelfth 3-level limiters 147 to 150 is output to the third cross-correlator 157.

In addition, the data that was converted from 5-bit to 2-bit data and thus limited to three levels by the thirteenth through sixteenth 3-level limiters 151 to 154 is output to the fourth cross-correlator 158.

In the third cross-correlator 157, correlation coefficients are respectively computed, the correlation coefficients expressing the differential phase of the input RF signal from the outputs of the ninth and tenth 3-level limiters 147 and 148, and from the outputs of the eleventh and twelfth 3-level limiters 149 and 150. The computed results are added together in the third cross-correlator 157 and output to the second adding unit 160.

In the fourth cross-correlator 158, correlation coefficients are respectively computed, the correlation coefficients expressing the differential phase of the input RF signal from the outputs of the thirteenth and fourteenth 3-level limiters 151 and 152, and from the outputs of the fifteenth and sixteenth 3-level limiters 153 and 154. The computed results are added together in the fourth cross-correlator 158 and output to the second adding unit 160.

In the second adding unit 160, the output of the third cross-correlator 157 and the output of the fourth cross-correlator 158 are added together, and the added data signal B is output to the phase inverter/compositor 170.

In the phase inverter/compositor 170, the phases of the output signal A from the non-inverting unit 200 and the output signal B from the inverting unit 210 are inverted or left as-is in accordance with the level of a control signal INVERT. The signals are then composited by addition or subtraction, and the result is output to the clock switcher 180.

When the control signal INVERT has a low level of 0, normal processing is conducted in the phase inverter/compositor 170, with the output signal B of the inverting unit 210 being subtracted from the output signal A of the non-inverting unit 200, and the resulting signal [A-B] being output.

When the control signal INVERT has a high level of 1, inverse processing is conducted in the phase inverter/compositor 170, with the output signal A of the non-inverting unit 200 being subtracted from the output signal B of the inverting unit 210, and the resulting signal [B-A] being output.

In the clock switcher 180, the clock of the output signal from the phase inverter/compositor 170 is switched to the clock DPDCLK2 in accordance with a control signal DPD-CLKSEL, and the result is output to the output unit 190 as a 6-bit signal.

The output signal of the output unit 190 is then sent to a tracking servo control apparatus (not shown in the drawings) as the DPD tracking error signal TE.

According to the TE detection apparatus of the present embodiment, it is possible to realize a DPD TE detection apparatus by means of a high-speed, high-precision digital circuit.

Figure 7:
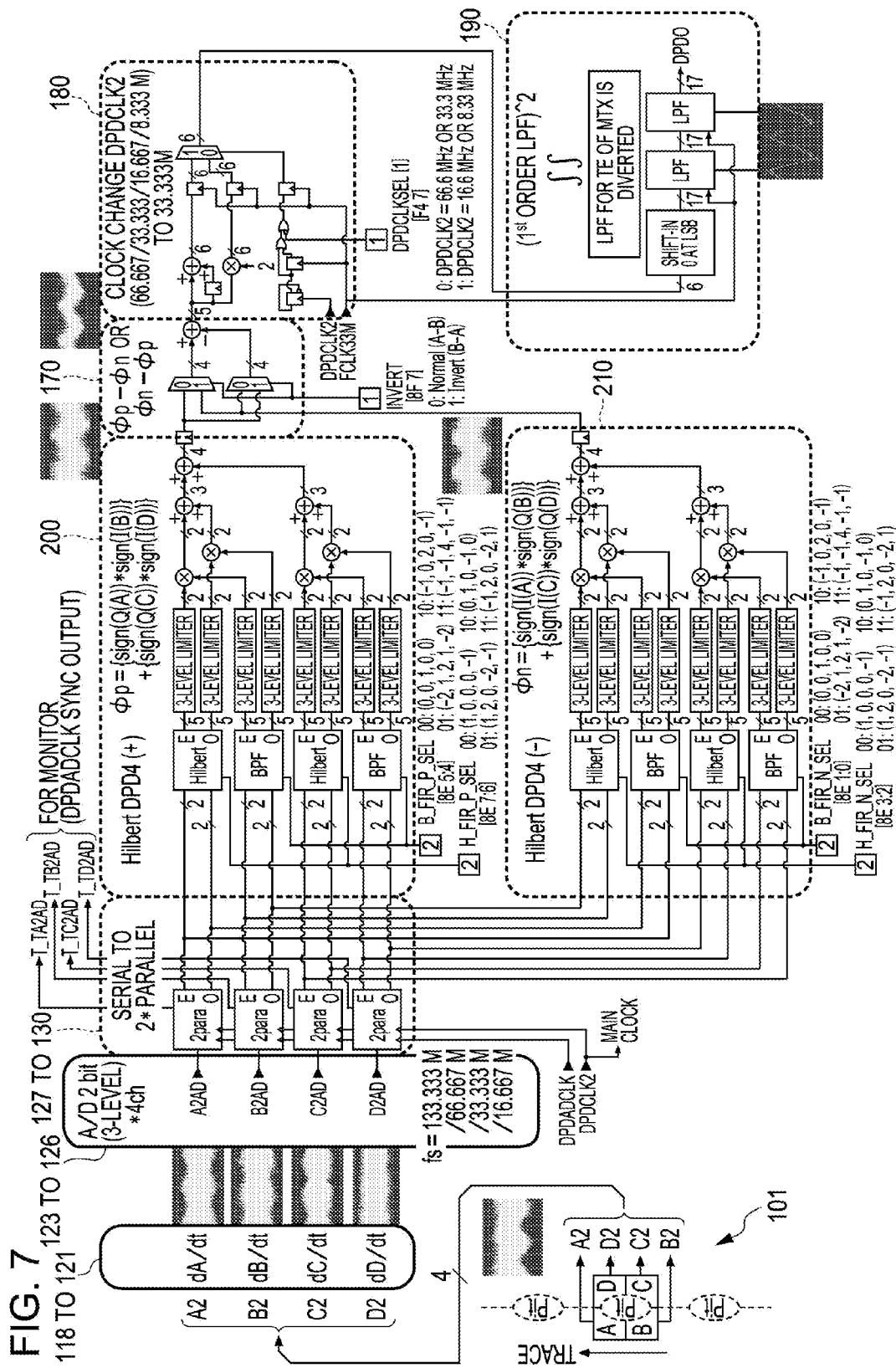
FIG. 7 schematically illustrates an example of digital DPD computation in a TE apparatus in accordance with an embodiment of the present invention.

FIG. 7 schematically illustrates exemplary digital DPD computation in a TE apparatus in accordance with the present embodiment. Although merely an example, in FIG. 7 Hilbert DPD processing is conducted by the non-inverting unit 200 and the inverting unit 210. In the non-inverting unit 200 shown by way of example in FIG. 7, an output signal φp is derived as follows.

$$\phi p = \{sign(Q(A))*sign(I(B))\} + \{sign(Q(C))*sign(I(D))\} \quad [\text{Eq. 2}]$$

In addition, in the inverting unit 210 shown by way of example in FIG. 7, an output signal φn is derived as follows.

$$\phi n = \{sign(I(A))*sign(Q(B))\} + \{sign(I(C))*sign(Q(D))\} \quad [\text{Eq. 3}]$$

In the phase inverter/compositor 170, either [φp-φn] or [φn-φp] is obtained from the output φp of the non-inverting unit 200 and the output φn of the inverting unit 210. The obtained result is then output from the output unit 190 via the clock switcher 180.

According to the foregoing embodiment, the following advantages are obtained.

(1) In contrast to a DPD circuit of the related art that includes an A/D converter, interpolator, high-range booster, and an edge-comparing (zero-cross-comparing) phase comparator, a configuration made up of A/D converters, Hilbert transformers, and correlation-detecting phase comparators is adopted herein. In so doing, the large-sized, highly sensitive analog high-range boost circuit can be eliminated to ensure stable, high-speed operation of the phase comparators, and in addition, it is possible to reduce the number of quantization bits in the A/D converters.

(2) The Hilbert transformers in advantage (1) are realized completely in digital by means of a [A/D converter*first FIR digital filter (Hilbert transformer)//second FIR digital filter (delay or BPF)] configuration. In so doing, the relative differential phase of 90° can be accurately realized without error or drift within the range from the DC (0 Hz) to the Nyquist (fs/2) frequencies, irrespective of the signal period.

(3) The correlation-detecting phase comparators in advantage (1) are realized by means of a [digital multiplier*Integral & Dump (Accumulator*S&H) integrator] configuration. Being used for integral detection, such a configuration does not involve a mechanism for removing pseudo-edges by means of an asynchronous recursive loop like that of a typical edge-comparing phase comparator. Static timing analysis (STA) using a completely synchronized design is therefore made possible, and the operational speed of the phase comparators is increased.

(4) The Hilbert transformers in advantage (2) principally exhibit band-pass characteristics such that the amplitude characteristics are zero at the DC (0 Hz) and Nyquist (fs/2) frequencies. Consequently, if a DPD TE detection circuit is constructed by combining the above Hilbert transformers with the correlation-detecting phase comparators in advantage (3), then the demodulated DC components of everything other than the TE signal become, in principle, zero. Thus, origin shift (i.e., offset) of the TE signal does not occur even when amplitude-constraining the signal before reaching the A/D converters. For this reason, the over-scale limiting effect can be utilized to reduce the number of quantization bits in the A/D converters.

(5) As described in advantage (4), by utilizing the overscale limiting effect of the A/D converters, the number of quantization bits can be reduced (reduction by 1 to 4 bits is possible), thereby also reducing the circuit scale. Furthermore, a drawback of the correlation-detecting phase comparators in advantage (3) can be addressed. In other words, a digital DPD circuit can be realized wherein the effects of the square of the TE sensitivity curve with respect to amplitude are suppressed.

(6) The sampling frequency of the A/D converters is taken to be 4.8 times the maximum repeating frequency in the RF signal at the innermost edge of the disc (in the case of a 12 cm disc). Doing so avoids sensitivity reductions in outer-edge TE detection caused by the effects of reverse phase components produced by RF folding. Thus, a traverse TE signal can be accurately detected, even when performing a full seek from the innermost edge to the outermost edge.

(7) Complementary configurations of a first [Hilbert transformer*correlation-detecting phase comparator] configuration and a second [Hilbert transformer*correlation-detecting phase comparator] configuration are implemented. By subsequently compositing both outputs, it is possible to improve the S/N ratio of the TE signal.

(8) The [first FIR digital filter (Hilbert transformer)//second FIR digital filter (delay or BPF)] configuration described above may be implemented as a single FIR filter having a dual system of independent taps and outputs (I, Q) interleaved in a comb array. As a result, it is possible to halve the circuit size of the FIR filter.

(9) The differential Hilbert DPD technique is also applicable to optical disc systems using constant angular velocity (CAV) control, and thus it is possible to reduce chip area and power consumption in such cases. Furthermore, the above is not limited to CAV control systems, and the detection of a stable tracking error is also possible as a result of the frequency band widening during a track jump. Furthermore, since an embodiment of the present invention is realizable by a digital circuit, it is advantageous for reducing costs on newer processes.

The TE detection apparatus described above is applicable to a Blu-ray disc or similar optical recording and playback apparatus (i.e., an optical disc apparatus) provided with a semiconductor laser whose wavelength is in the 400 nm band, for example.

FIG. 8 illustrates an exemplary configuration of an optical recording and playback apparatus able to adopt a TE detection apparatus in accordance with an embodiment of the present invention.

The optical recording and playback apparatus 400 includes a recording medium such as the optical disc 401, an optical pickup (optical head) 410, a DPD TE detection apparatus 420, a servo controller 430, a drive circuit 440, and a system controller 450.

The optical head 410 includes components such as: a laser diode 411, driven by a laser driving circuit, that records and retrieves digital data; a light-receiving element 412 that detects laser light emitted by the laser diode 411; optics 413, and an objective lens 414. The light-receiving element 412 herein corresponds to the light-receiving element 101 in the foregoing embodiments.

The TE detection apparatus 100 in the foregoing embodiments is herein applied as the DPD TE detection apparatus 420.

The servo controller 430 is controlled by the system controller 450, and includes components such as an ADC 431 that converts an analog TE signal from the DPD TE detection apparatus 420 to a digital signal, a servo filter 432, and a PWM circuit 433 that conducts PWM control of the drive circuit 440.

It should be appreciated herein that a subsystem for processing a focus error signal has been omitted in FIG. 8.

The drive circuit 440 includes a tracking driver 441, and drives the tracking mechanism of the objective lens 414.

It should be appreciated that the above optical recording and playback apparatus is merely an example, and that an optical recording and playback apparatus to which an embodiment of the present invention has been applied is not limited to the configuration shown in FIG. 8.

The present application contains subject matter related to that disclosed in Japanese Priority Patent Application JP 2008-253077 filed in the Japan Patent Office on Sep. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A differential phase detection (DPD) tracking error signal detection apparatus, comprising:

first, second, third, and fourth differentiators configured to remove DC signal components of and differentiate a first signal, a second signal, a third signal, and a fourth signal whose differential phases with respect to each other vary according to a tracking error;

a first analog/digital (A/D) converter configured to sample and quantize an output of the first differentiator;

a second A/D converter configured to sample and quantize an output of the second differentiator;

a third A/D converter configured to sample and quantize an output of the third differentiator;

a fourth A/D converter configured to sample and quantize an output of the fourth differentiator;

a non-inverting unit configured to conduct non-inverting processing with respect to the output of the first, second, third, and fourth A/D converters;

an inverting unit configured to conduct inverting processing with respect to the output of the first, second, third, and fourth A/D converters, and cooperatively conduct differential processing with the non-inverting unit; and a phase inverter/compositor configured to leave as-is or invert a phase of output signals of the non-inverting unit and the inverting unit, in accordance with a control signal;

wherein the non-inverting unit includes a first Hilbert transformer configured to phase-shift the output of the first A/D converter by 90°, irrespective of a period of the DC signal component of the first signal, a first delay unit configured to delay the output of the second A/D converter so as to match a first delay amount of the first Hilbert transformer, a second Hilbert transformer configured to phase-shift the output of the third A/D converter by 90°, irrespective of a period of the DC signal component of the third signal, a second delay unit configured to delay the output of the fourth A/D converter so as to match a second delay amount of the second Hilbert transformer, a first cross-correlator configured to calculate a first cross-correlation between an output of the first Hilbert transformer and an output of the first delay unit, a second cross-correlator configured to calculate a second cross-correlation between an output of the second Hilbert transformer and an output of the second delay unit, and a first adding unit configured to add together an output of the first cross-correlator and an output of the second cross-correlator, and output a first added result to the phase inverter/compositor as the output signal of the non-inverting unit; and wherein the inverting unit includes a third Hilbert transformer configured to phase-shift the output of the second A/D converter by 90°, irrespective of a period of the DC signal component of the second signal, a third delay unit configured to delay the output of the first A/D converter so as to match a third delay amount of the third Hilbert transformer, a fourth Hilbert transformer configured to phase-shift the output of the fourth A/D converter by 90°, irrespective of a period of the DC signal component of the fourth signal, a fourth delay unit configured to delay the output of the third A/D converter so as to match a fourth delay amount of the fourth Hilbert transformer, a third cross-correlator configured to calculate a third cross-correlation between an output of the third Hilbert transformer and an output of the third delay unit, a fourth cross-correlator configured to calculate a fourth cross-correlation between an output of the fourth Hilbert transformer and an output of the fourth delay unit, and a second adding unit configured to add together an output of the third cross-correlator and an output of the fourth cross-correlator, and output a second added result to the phase inverter/compositor as the output signal of the inverting unit; and further comprising:

a first serial/parallel converter configured to convert the output of the first A/D converter from first serial data into first parallel data, and output the first parallel data to the first Hilbert transformer of the non-inverting unit and the third delay unit of the inverting unit;

a second serial/parallel converter configured to convert the output of the second A/D converter from second serial data into second parallel data, and output the second parallel data to the first delay unit of the non-inverting unit and the third Hilbert transformer of the inverting unit;

a third serial/parallel converter configured to convert the output of the third A/D converter from third serial data into third parallel data, and output the third parallel data to the second Hilbert transformer of the non-inverting unit and the fourth delay unit of the inverting unit; and a fourth serial/parallel converter configured to convert the output of the fourth A/D converter from fourth serial data into fourth parallel data, and output the fourth parallel data to the second delay unit of the non-inverting unit and the fourth Hilbert transformer of the inverting unit.

2. The tracking error signal detection apparatus according to claim 1, wherein frequency settings of the first and second Hilbert transformers in the non-inverting unit can be individually set such that their frequencies differ from frequencies of frequency settings of the third and fourth Hilbert transformers in the inverting unit.

3. The tracking error signal detection apparatus according to claim 1 or claim 2, wherein
    delayed output of the first, second, third, and fourth delay units is formed so as to exhibit the characteristics of a band-pass filter (BPF), and
    frequency settings of the first and second delay units in the non-inverting unit can be individually set such that frequencies differ from frequencies of frequency settings of the third and fourth delay units in the inverting unit.

4. The tracking error signal detection apparatus according to claim 1, wherein level limiters are disposed at the outputs of the first, second, third, and fourth Hilbert transformers, as well as at the outputs of the first, second, third, and fourth delay units.

5. The tracking error signal detection apparatus according to claim 1, further comprising:
    first, second, third, and fourth AC couplers configured to remove the DC signal components of the first, second, third, and fourth signals whose differential phases with respect to each other vary according to the tracking error;
    first, second, third, and fourth variable gain units configured to adjust output of the first, second, third, and fourth AC couplers in accordance with level fluctuations in an optical head output;
    first, second, third, and fourth anti-aliasing filters (AAFs) configured to band-limit output of the first, second, third, and fourth variable gain units to prevent folding of out-of-band components; and
    first, second, third, and fourth amplifiers configured to amplify output of the first, second, third, and fourth AAFs to a predetermined level, and output the amplified outputs to the corresponding first, second, third, and fourth differentiators.

6. The tracking error signal detection apparatus according to claim 5, wherein the cutoff frequency of the first, second, third, and fourth AAFs is higher than (ro/ri) times a highest repeating frequency of an RF signal, wherein ri is taken to be an innermost edge or seek start radius of an optical disc (i.e., recording medium), and ro is taken be an outermost edge or seek target radius.

7. The tracking error signal detection apparatus according to claim 5, wherein the cutoff frequency of the first, second, third, and fourth AAFs is higher than 2.4 times a highest repeating frequency of an RF signal.

8. The tracking error signal detection apparatus according to claim 5, wherein a predetermined gain in each amplifier is determined such that an overscale limiting effect is achieved in the first, second, third, and fourth A/D converters.

9. The tracking error signal detection apparatus according to claim 8, wherein the first, second, third, and fourth A/D converters are driven by a same sampling clock asynchronous with an input RF signal, and additionally, wherein the sampling clock frequency is higher than 2*(ro/ri) times a highest repeating frequency of the RF signal, wherein ri is taken to be an innermost edge or seek start radius of an optical disc (i.e., recording medium), and ro is taken be an outermost edge or seek target radius.

10. The tracking error signal detection apparatus according to claim 8, wherein the first, second, third, and fourth A/D converters are driven by a same sampling clock asynchronous with an input RF signal, and additionally, wherein the sampling clock frequency is higher than 4.8 times a highest repeating frequency of the RF signal.

11. The tracking error signal detection apparatus according to claim 1, wherein the first Hilbert transformer and the first delay unit, the second Hilbert transformer and the second delay unit, the third Hilbert transformer and the third delay unit, and the fourth Hilbert transformer and the fourth delay unit are realized by means of first, second, third, and fourth FIR filters having a dual system of independent taps and outputs (I, Q) interleaved in a comb array.

* * * * *